United States Patent
Takatsuka et al.

(10) Patent No.: US 8,482,645 B2
(45) Date of Patent: Jul. 9, 2013

(54) SOLID-STATE IMAGING DEVICE, DRIVING METHOD AND ELECTRONIC APPARATUS

(75) Inventors: Takafumi Takatsuka, Kanagawa (JP); Akihiko Kato, Tokyo (JP); Yusuke Oike, Kanagawa (JP); Masaki Sakakibara, Kanagawa (JP)

(73) Assignee: Sony Corporation, Tokyo (JP)

( * ) Notice: Subject to any disclaimer, the term of this patent is extended or adjusted under 35 U.S.C. 154(b) by 255 days.

(21) Appl. No.: 13/064,372

(22) Filed: Mar. 22, 2011

(65) Prior Publication Data

US 2011/0242389 A1  Oct. 6, 2011

(30) Foreign Application Priority Data

Mar. 31, 2010  (JP) ................... P2010-080524

(51) Int. Cl.
- *H04N 3/14* (2006.01)
- *H04N 5/335* (2011.01)
- *H04N 5/217* (2011.01)

(52) U.S. Cl.
USPC ............................ 348/308; 348/302; 348/241

(58) Field of Classification Search
USPC .................. 348/241–251, 302–310
See application file for complete search history.

(56) References Cited

U.S. PATENT DOCUMENTS

| | | | | |
|---|---|---|---|---|
| 7,427,736 | B2* | 9/2008 | Xu et al. | 250/208.1 |
| 7,476,836 | B2* | 1/2009 | Boemler | 250/208.1 |
| 8,212,905 | B2* | 7/2012 | Noda et al. | 348/301 |
| 8,284,286 | B2* | 10/2012 | Mabuchi | 348/308 |
| 2004/0051801 | A1* | 3/2004 | Iizuka et al. | 348/294 |
| 2004/0174450 | A1* | 9/2004 | Lee et al. | 348/308 |
| 2004/0239791 | A1* | 12/2004 | Mabuchi | 348/315 |
| 2008/0043130 | A1* | 2/2008 | Mabuchi | 348/308 |
| 2009/0244345 | A1* | 10/2009 | Song et al. | 348/308 |
| 2009/0251582 | A1 | 10/2009 | Oike | |
| 2010/0066879 | A1* | 3/2010 | Tanaka | 348/300 |
| 2010/0110248 | A1* | 5/2010 | Chou | 348/300 |
| 2010/0149366 | A1* | 6/2010 | Noda et al. | 348/222.1 |
| 2010/0149390 | A1* | 6/2010 | Huang et al. | 348/294 |
| 2011/0074996 | A1* | 3/2011 | Wang et al. | 348/311 |
| 2012/0162484 | A1* | 6/2012 | Mo et al. | 348/241 |
| 2013/0050553 | A1* | 2/2013 | Bugnet et al. | 348/308 |

FOREIGN PATENT DOCUMENTS

| | | |
|---|---|---|
| JP | 2001-238132 | 8/2001 |
| JP | 2009-268083 | 11/2009 |

\* cited by examiner

*Primary Examiner* — Lin Ye
*Assistant Examiner* — Chia-Wei A Chen
(74) *Attorney, Agent, or Firm* — Rader, Fishman & Grauer PLLC

(57) ABSTRACT

Disclosed herein is a solid-state imaging device employing a plurality of unit pixels each having an opto-electric conversion section configured to convert incident light into electric charge and an electric-charge holding section configured to hold a signal voltage representing the electric charge produced by the opto-electric conversion section, the solid-state imaging device further including a read section and a control section.

18 Claims, 22 Drawing Sheets

RELATED ART

SOLID-STATE IMAGING DEVICE, DRIVING METHOD AND ELECTRONIC APPARATUS

BACKGROUND OF THE INVENTION

1. Field of the Invention

The present invention relates to a solid-state imaging device, a driving method and an electronic apparatus. More specifically, the present invention relates to a solid-state imaging device capable of reducing coupling noises, a method for driving the solid-state imaging device and an electronic apparatus employing the solid-state imaging device.

2. Description of the Related Art

As is generally known, a solid-state imaging device in related art employs a plurality of unit pixels each having a photodiode, a floating diffusion area and a transfer gate.

In every unit pixel employed in such a solid-state imaging device, in an operation to take an image of an imaging object, light generated by the imaging object is received by the photodiode 11 as shown in FIG. 1. The photodiode 11 converts the light into electric charge and accumulates the electric charge internally. Then, when a transfer pulse (or a transfer voltage) TRG is applied to the transfer-gate transistor 12 connected to the photodiode 11, the electric charge accumulated in the photodiode 11 is transferred to the floating diffusion area 13 by way of the transfer-gate transistor 12. The floating diffusion area 13 converts the electric charge into a voltage.

Then, when a select pulse (or a select voltage) SEL is applied to a select transistor 15 connected to a vertical signal line 14, the voltage generated by the floating diffusion area 13 is output to an external destination through an amplification transistor 16, the select transistor 15 and the vertical signal line 14 as a signal level.

In a state of applying the select pulse SEL to the select transistor 15 as it is, when a reset pulse (or a reset voltage) RST is applied to a reset transistor 17 later on, the voltage generated by the floating diffusion area 13 is reset to a voltage Vr determined in advance. Subsequently, a post-reset voltage generated by the floating diffusion area 13 is output to the external destination through the amplification transistor 16, the select transistor 15 and the vertical signal line 14 as a reset level.

The external destination computes the difference between the signal and reset levels output by the unit pixel as described above and takes the difference as the pixel signal of the unit pixel. It is worth noting that, in this specification, the technical term 'pixel signal' is used to imply the signal and/or reset levels themselves in some cases. It is to be noted that, if it is not necessary to hold electric charge in the floating diffusion area 13, the reset level can be read out in advance before the signal level is read out.

In general, in an operation to read out a pixel signal from a unit pixel in the solid-state imaging device, in order to eliminate noises such as threshold-voltage variations of the amplification transistor 16, the difference between the signal and reset levels is taken as the pixel signal in the so-called CDS (Correlated Double Sampling) processing.

At that time, since the signal and reset levels are read out from the unit pixel by making use of the same reset transistor 17, the same amplification transistor 16, the same select transistor 15 and the same vertical signal line 14, it is possible to eliminate fixed pattern noises such as threshold-voltage variations of the transistors.

By the way, a solid-state imaging device may have a function referred to as a global shutter function or a global exposure function. For more information on such a solid-state imaging device, the reader is advised to refer to documents such as Japanese Patent Laid-open Nos. 2001-238132 and 2009-268083. In such a solid-state imaging device, a global exposure operation is carried out on all unit pixels at the same time. In the global exposure operation, electric charge is transferred from the photodiode to the floating diffusion area for all unit pixels at the same time. With the electric charge held in the floating diffusion area, pixel signals are read out from the unit pixels sequentially.

Before the pixel signal is read out from the unit pixel, the floating diffusion area has been once reset in a batch operation carried out by a solid-state imaging device having the global shutter function to transfer electric charge from the photodiode to the floating diffusion area for all unit pixels at the same time or at the start of an exposure operation. In this case, electric charge will have been accumulated in the floating diffusion area at the time the pixel signal is read out from the unit pixel. Thus, in order to eliminate fixed pattern noises such as threshold-voltage variations of the amplification transistor 16, it is necessary to read out a reset level by resetting the floating diffusion area to a predetermined voltage after reading out the signal level.

For example, let pixel signals be read out sequentially from unit pixels provided on the (i-1)th pixel row and unit pixels provided on the ith pixel row on the light receiving surface of the solid-state imaging device as shown in FIG. 2.

In FIG. 2, the horizontal axis represents the lapse of time. Reference symbol $SEL_{i-1}$ denotes the voltage of the select pulse SEL applied to the gate electrode of the select transistor 15 employed in the unit pixel provided on the (i-1)th pixel row. On the other hand, reference symbol $RST_{i-1}$ denotes the voltage of the reset pulse RST applied to the gate electrode of the reset transistor 17 employed in the unit pixel provided on the (i-1)th pixel row. In addition, reference symbol $TRG_{i-1}$ denotes the voltage of the transfer pulse TRG applied to the gate electrode of the transfer-gate transistor 12 employed in the unit pixel provided on the (i-1)th pixel row whereas reference symbol $FD_{i-1}$ denotes the voltage appearing at the floating diffusion area included in the unit pixel provided on the (i-1)th pixel row.

By the same token, reference symbol $SEL_i$ denotes the voltage of the select pulse SEL applied to the gate electrode of the select transistor 15 employed in the unit pixel provided on the ith pixel row. On the other hand, reference symbol $RST_i$ denotes the voltage of the reset pulse RST applied to the gate electrode of the reset transistor 17 employed in the unit pixel provided on the ith pixel row. In addition, reference symbol $TRG_i$ denotes the voltage of the transfer pulse TRG applied to the gate electrode of the transfer-gate transistor 12 employed in the unit pixel provided on the ith pixel row whereas reference symbol $FD_i$ denotes the voltage appearing at the floating diffusion area included in the unit pixel provided on the ith pixel row.

In addition, reference symbol $V_{out}$ denotes a voltage appearing on the vertical signal line 14 connected to unit pixels provided on the (i-1)th and ith pixel rows. To put it in detail, reference symbol $V_{out}$ denotes a voltage appearing on the vertical signal line 14 connected to the select transistors 15 employed in unit pixels provided on the (i-1)th and ith pixel rows. The vertical signal line 14 is provided for every pixel column.

First of all, during a period TM11, an all-pixel simultaneous electronic shutter operation is carried out in the solid-state imaging device. The exposure operation is started for all unit pixels at the same time.

During the period TM11, on the (i-1)th pixel row, the voltage $TRG_{i-1}$ of the transfer pulse TRG is raised in order to transfer electric charge from the photodiode to the floating diffusion area whereas the voltage $RST_{i-1}$ of the reset pulse RST is raised in order to reset the electric charge held in the floating diffusion area. By the same token, on the ith pixel row, the voltage TRG of the transfer pulse TRG is raised in order to transfer electric charge from the photodiode to the floating diffusion area whereas the voltage $RST_i$ of the reset pulse RST is raised in order to reset the electric charge held in the floating diffusion area. At that time, the pixel signal is not read out from the unit pixel. Thus, the voltage $SEL_{i-1}$ and the voltage $SEL_i$ of the select pulses SEL in all unit pixels are sustained at a low level.

It is to be noted that, in the following description, the operation to raise the voltage $RST_{i-1}$ or $RST_i$ of the reset pulse RST applied to the gate electrode of the reset transistor 17 to a high level is referred to as an operation to activate the reset pulse RST (or activate the reset transistor 17). By the same token, the operation to raise the voltage $TRG_{i-1}$ or $TRG_i$ of the transfer pulse TRG applied to the gate electrode of the transfer-gate transistor 12 to a high level is referred to as an operation to activate the transfer pulse TRG (or activate the transfer-gate transistor 12).

The all-pixel simultaneous electronic shutter operation is followed by a period TM12 during which an exposure operation is carried out at the same time on all unit pixels. After a period determined in advance has lapsed since the start of the period TM12, the reset pulse RST is activated for the unit pixels on the (i-1)th and ith pixel rows in order to reset the floating diffusion area. Then, later on, the transfer pulse TRG is activated for all unit pixels in order to transfer electric charge from the photodiode to the floating diffusion area in each of the unit pixels.

For example, in the unit pixel provided on the (i-1)th pixel row, the reset pulse RST is activated in order to reset the voltage $FD_{i-1}$ appearing at the floating diffusion area to a voltage $VFD1_{i-1}'$. After that, the transfer pulse TRG is activated in order to transfer electric charge from the photodiode to the floating diffusion area so that a voltage $VFD1_{i-1}$ appears at the floating diffusion area.

The period TM12 is followed by the period TM13 during which pixel signals are read out sequentially from unit pixels. That is to say, during the period TM13, signal and reset levels are read out from the unit pixels.

First of all, a voltage is applied to the select transistor 15 of the unit pixel provided on the (i-1)th pixel row. That is to say, the voltage $SEL_{i-1}$ is raised from a low level to a high level in order to read out the voltage $FD_{i-1}$ (=$VFD1_{i-1}$) appearing at the floating diffusion area of the unit pixel provided on the (i-1)th pixel row. Thus, the voltage $V_{out}$ appearing on the vertical signal line 14 is set at a voltage $V_{sig}\_i-1$. In a period RD11, the voltage $V_{sig}\_i-1$ is read out as the signal level of the unit pixel provided on the (i-1)th pixel row.

In addition, after the period RD11 has been ended, the reset pulse RST of the unit pixel provided on the (i-1)th pixel row is activated in order to reset the voltage $FD_{i-1}$ appearing at the floating diffusion area of the unit pixel provided on the (i-1)th pixel row to a signal level $VFD2_{i-1}$. Thus, the voltage $V_{out}$ of the vertical signal line 14 is raised to a voltage $V_{rst}\_i-1$. In a period RD12, the voltage $V_{rst}\_i-1$ is read out as the reset level of the unit pixel provided on the (i-1)th pixel row. The difference between the signal and reset levels read out as described above is then output as a pixel signal.

After the operation to read out the pixel signal from the unit pixel provided on the (i-1)th pixel row has been completed, the voltage $SEL_{i-1}$ applied to the select transistor 15 is changed from the high level back to the low level. Then, an operation to read out the pixel signal from the unit pixel provided on the ith pixel row is carried out as follows.

A voltage is applied to the select transistor 15 employed in the unit pixel provided on the ith pixel row in order to read out the voltage $FD_i$ (=$VFD1i$) appearing at the floating diffusion area of the unit pixel provided on the ith pixel row. Thus, by applying the voltage to the select transistor 15, the voltage $V_{out}$ of the vertical signal line 14 is set at a voltage $V_{sig}\_i$. In a period RD13, the voltage $V_{sig}\_i$ is read out as the signal level of the unit pixel provided on the ith pixel row.

Then, after the period RD13 has been ended, the reset pulse RST of the unit pixel provided on the ith pixel row is activated in order to reset the voltage $FD_i$ appearing at the floating diffusion area of the unit pixel provided on the (i-1)th pixel row to a signal level $VFD2_i$. Thus, the voltage $V_{out}$ of the vertical signal line 14 is raised to a voltage $V_{rst}\_i$. In a period RD14, the voltage $V_{rst}\_i$ is read out as the reset level of the unit pixel provided on the ith pixel row.

In the operation to obtain a pixel signal as described above, the signal and reset levels are read out through the same path to be used for computing a difference between the signal and reset levels. Thus, it is possible to eliminate fixed pattern noises such as threshold-voltage variations of the amplification transistor 16.

SUMMARY OF THE INVENTION

A method for holding electric charge in the floating diffusion area described above is typically an effective method capable of implementing an all-pixel batch exposure operation in a minority element small area. With a solid-state imaging device adopting the method for holding electric charge in the floating diffusion area, however, fixed pattern noises can be eliminated even though coupling noises received by the floating diffusion area from other signal lines and the like cannot.

As shown in FIG. 3 for example, at the time the floating diffusion area is reset prior to a transfer of electric charge from the photodiode to the floating diffusion area, the voltage $SEL_i$ of the select pulse SEL applied to the select transistor 15 is sustained at a low level. At the time the floating diffusion area is reset in order to read out the reset level after the signal level has been read out, on the other hand, the voltage $SEL_i$ of the select pulse SEL applied to the select transistor 15 is sustained at a high level.

It is to be noted that the horizontal axis of FIG. 3 represents the lapse of time. Reference symbols $SEL_i$, $RST_i$, $FD_i$ and $V_{out}$ denote the voltage of the select pulse SEL of the unit pixel, the voltage of the reset pulse RST of the unit pixel, the voltage appearing at the floating diffusion area and the voltage appearing on the vertical signal line 14 respectively. In addition, in order to make the explanation with reference to FIG. 3 easy to understand, signal electric charge is assumed to be a dark-time signal which is a signal generated at a dark time. That is to say, the signal electric charge is read out at a time when there is essentially no electric charge transferred from the photodiode to the floating diffusion area.

First of all, before the signal level is read out, a reset pulse RST1 is applied to the reset transistor 17 in order to reset the floating diffusion area. When the reset pulse RST1 is applied to the reset transistor 17, the voltage $FD_i$ appearing at the floating diffusion area becomes Vfd1'. Afterward, in order to read out the signal level, the voltage $SEL_i$ of the select pulse SEL is changed from a low level to a high level. At that time, the voltage $V_{out}$ appearing on the vertical signal line 14 makes an attempt to rise from 0V to $V_{sig}0$.

The floating diffusion area is connected to the gate electrode of the amplification transistor 16 whereas the vertical signal line 14 is connected to the source electrode of the amplification transistor 16. Thus, when the voltage $V_{out}$ appearing on the vertical signal line 14 makes an attempt to rise from 0V to a level Vsig0, due to a coupling feed effect, the voltage appearing at the floating diffusion area is modulated, changing from the level Vfd1' to a level Vfd1. Thus, the voltage $V_{out}$ appearing on the vertical signal line 14 eventually rises from 0V not to the level Vsig0, but to a level Vsig determined from the level Vfd1 of the voltage $FD_i$ appearing at the floating diffusion area. Thus, during a period RD21, the voltage $V_{out}$ (=Vsig) is read out as the signal level.

After the signal level has been read out, on the other hand, in order to read out the reset level, a reset pulse RST2 is applied to the reset transistor 17. When the reset pulse RST2 is applied to the reset transistor 17, the floating diffusion area is reset, changing its voltage $FD_i$ from the level Vfd1 to the level Vfd2. As a result, the voltage $V_{out}$ appearing on the vertical signal line 14 changes from the level Vsig to a level Vrst. Then, during a period RD22, the voltage $V_{out}$ (=Vrst) is read out as the reset level. It is to be noted that, when the reset pulse RST2 is applied to the reset transistor 17, the voltage $SEL_i$ of the select pulse SEL is sustained at the high level as it is. Thus, there is no voltage change caused by a coupling effect of the voltage $V_{out}$ appearing on the vertical signal line 14. As a result, the voltage appearing at the floating diffusion area is not modulated from the level Vfd2.

The signal level Vsig read out from the unit pixel is compared with the reset level Vrst also read out from the unit pixel as follows. As described above, signal electric charge is assumed to be a dark-time signal which is a signal generated at a dark time at which there is no electric charge essentially transferred from the photodiode to the floating diffusion area. Thus, normally, the signal level Vsig should be equal to the reset level Vrst.

In the typical example shown in FIG. 3, when the reset pulse RST1 is applied, the select pulse SEL is sustained at a low level. Before the reset pulse RST2 is applied, however, the select pulse SEL is changed from the low level to a high level. Thus, the floating diffusion area already reset by the reset pulse RST1 is affected by a coupling effect generated by the voltage $V_{out}$ appearing on the vertical signal line 14 as an effect accompanying a level change of the select pulse SEL.

After the reset pulse RST2 has been applied, on the other hand, the select pulse SEL is sustained ongoingly at the high level as it is. Thus, the floating diffusion area already reset by the reset pulse RST2 is not affected by a coupling effect generated by the voltage $V_{out}$ appearing on the vertical signal line 14.

As a result, there is undesirably a difference ΔVcup between the signal level Vsig and the reset level Vrst which should normally be equal to each other. The difference ΔVcup becomes a noise. The noise generated in this way is particularly referred to as a coupling noise.

The coupling noise is generated not only between the floating diffusion area and the vertical signal line 14, but also between the floating diffusion area and all members which each seem to have a parasitic capacitance. A typical example of the member seeming to have a parasitic capacitance is an overflow gate for preventing blooming as will be described later. In addition, the coupling noise has a quantity varying from reset operation to reset operation. On top of that, the quantity of the coupling noise also varies in accordance with the state of a drive signal driving another element.

As described above, the solid-state imaging device holding electric charge in the floating diffusion area is not capable of eliminating the coupling noise, which has been generated due to a coupling effect applied by another signal line or the like to the floating diffusion area, from the pixel signal.

It is thus desired for the present invention to reduce the quantity of a coupling noise included in the pixel signal.

A solid-state imaging device according to a first embodiment of the present invention is a solid-state imaging device employing a plurality of unit pixels each having an opto-electric conversion section configured to convert incident light into electric charge and an electric-charge holding section configured to hold a signal voltage representing the electric charge produced by the opto-electric conversion section. The solid-state imaging device further includes:

read means for reading out a reset voltage appearing on the electric-charge holding section as a result of setting the electric-charge holding section at a predetermined voltage from the electric-charge holding section as a reset level at a reset-level read time after reading out the signal voltage representing the electric charge produced by the opto-electric conversion section from the electric-charge holding section as a signal level at a signal-level read time and for computing a difference between the signal level and the reset level in order to generate a pixel signal; and control means for controlling an operation to provide the unit pixel with a pixel driving signal driving the unit pixel but affecting a coupling phenomenon occurring in the electric-charge holding section so as to make:

the state of the pixel driving signal at a first reset time at which the electric-charge holding section is reset immediately prior to a transfer of electric charge from the opto-electric conversion section to the electric-charge holding section the same as the state of the pixel driving signal at a second reset time at which the electric-charge holding section is reset immediately prior to an operation to read out the reset level from the electric-charge holding section; and the state of the pixel driving signal at the signal-level read time the same as the state of the pixel driving signal at the reset-level read time.

It is possible to provide a configuration in which the pixel driving signal is used as a select pulse for selecting the unit pixel from which the pixel signal is read out.

It is also possible to provide a configuration in which the pixel driving signal is used as a control pulse for driving an electric-charge discarding section employed in the unit pixel to serve as a section for discarding electric charge accumulated in the opto-electric conversion section.

It is also possible to provide a configuration in which the a voltage determined in advance is applied to a signal line connected to the read means to serve as a line for reading out the signal and reset levels from the electric-charge holding section.

It is also possible to provide a configuration in which the control means controls the unit pixels composing a plurality of pixel rows each including the unit pixels laid out in a direction determined in advance so as to carry out a reset operation on the pixel rows simultaneously at the first reset time.

It is also possible to provide a configuration in which the control means controls the unit pixels composing a plurality of pixel rows each including the unit pixels laid out in a direction determined in advance so as to carry out an operation to transfer electric charge from the opto-electric conversion section to the electric-charge holding section for the pixel rows at the same time.

It is also possible to provide a configuration in which:

the control means employs output means used for outputting the pixel driving signal and composed of a first transistor for turning on the pixel driving signal and a second transistor for turning off the pixel driving signal; and the control means controls the output means so as to shift a driving timing of the first transistor from a driving timing of the second transistor.

It is also possible to provide a configuration in which the output means further has a current limiter for suppressing output fluctuations generated by a power supply connected to the first transistor and output fluctuations generated by a power supply connected to the second transistor.

It is also possible to provide a configuration in which:

the gate electrode of a third transistor employed in the current limiter is connected by a switch or a resistor to a bias line set at a voltage determined in advance;

an electrical capacitance is provided between the gate electrode and the source electrode of the first or second transistor in order to make the magnitude of a current flowing through the third transistor constant.

It is also possible to provide a configuration in which the control means controls the current limiter so as to put the current limiter in an operative state during an operation to drive a plurality of aforementioned pixel rows at the same time and put the current limiter in an inoperative state during an operation to drive only one of the aforementioned pixel rows.

It is also possible to provide a configuration in which the pixel driving signal includes a select pulse for selecting the unit pixel from which the pixel signal is read out and a control pulse for driving an electric-charge discarding section employed in the unit pixel to serve as a section for discarding electric charge accumulated in the opto-electric conversion section; and at both the first and second reset times, the control pulse for driving an electric-charge discarding section is set in an active state at a high level and the select pulse is set in an inactive state at a low level.

A driving method according to the first embodiment of the present invention is a method for driving a solid-state imaging device employing a plurality of unit pixels each having an opto-electric conversion section configured to convert incident light into electric charge and an electric-charge holding section configured to hold a signal voltage representing the electric charge produced by the opto-electric conversion section. The driving method includes the steps of:

reading out a reset voltage appearing on the electric-charge holding section as a result of setting the electric-charge holding section at a predetermined voltage from the electric-charge holding section as a reset level at a reset-level read time after reading out the signal voltage representing the electric charge produced by the opto-electric conversion section from the electric-charge holding section as a signal level at a signal-level read time and for computing a difference between the signal level and the reset level in order to generate a pixel signal; and controlling an operation to provide the unit pixel with a pixel driving signal driving the unit pixel but affecting a coupling phenomenon occurring in the electric-charge holding section so as to make:

the state of the pixel driving signal at a first reset time at which the electric-charge holding section is reset immediately prior to a transfer of electric charge from the opto-electric conversion section to the electric-charge holding section the same as the state of the pixel driving signal at a second reset time at which the electric-charge holding section is reset immediately prior to an operation to read out the reset level from the electric-charge holding section; and the state of the pixel driving signal at the signal-level read time the same as the state of the pixel driving signal at the reset-level read time.

It is possible to implement the driving method by which the pixel driving signal is used as a select pulse for selecting the unit pixel from which the pixel signal is read out.

It is possible to implement the driving method by which the pixel driving signal is used as a control pulse for driving an electric-charge discarding section employed in the unit pixel to serve as a section for discarding electric charge accumulated in the opto-electric conversion section.

It is possible to implement the driving method by which the a voltage determined in advance is applied to a signal line connected to read means of the solid-state imaging device to serve as a line for reading out the signal and reset levels from the electric-charge holding section.

It is possible to implement the driving method by which the unit pixels composing a plurality of pixel rows each including the unit pixels laid out in a direction determined in advance are controlled so as to carry out a reset operation on the pixel rows simultaneously at the first reset time.

It is possible to implement the driving method by which the unit pixels composing a plurality of pixel rows each including the unit pixels laid out in a direction determined in advance are controlled so as to carry out an operation to transfer electric charge from the opto-electric conversion section to the electric-charge holding section for the pixel rows at the same time.

In accordance with the first embodiment of the present invention, in a solid-state imaging device employing a plurality of unit pixels each having an opto-electric conversion section configured to convert incident light into electric charge and an electric-charge holding section configured to hold a signal voltage representing the electric charge produced by the opto-electric conversion section:

a reset voltage appearing on the electric-charge holding section as a result of setting the electric-charge holding section at a predetermined voltage is read out from the electric-charge holding section as a reset level at a reset-level read time after the signal voltage representing the electric charge produced by the opto-electric conversion section has been read out from the electric-charge holding section as a signal level at a signal-level read time and, then, a difference between the signal level and the reset level is computed in order to generate a pixel signal; and an operation to provide the unit pixel with a pixel driving signal driving the unit pixel but affecting a coupling phenomenon occurring in the electric-charge holding section is controlled so as to make:

the state of the pixel driving signal at a first reset time at which the electric-charge holding section is reset immediately prior to a transfer of electric charge from the opto-electric conversion section to the electric-charge holding section the same as the state of the pixel driving signal at a second reset time at which the electric-charge holding section is reset immediately prior to an operation to read out the reset level from the electric-charge holding section; and the state of the pixel driving signal at the signal-level read time the same as the state of the pixel driving signal at the reset-level read time.

An electronic apparatus according to a second embodiment of the present invention is an apparatus including a plurality of unit pixels each having an opto-electric conversion section configured to convert incident light into electric charge and an electric-charge holding section configured to hold a signal voltage representing the electric charge produced by the opto-electric conversion section. The electronic apparatus further has:

read means for reading out a reset voltage appearing on the electric-charge holding section as a result of setting the electric-charge holding section at a predetermined voltage from the electric-charge holding section as a reset level at a reset-level read time after reading out the signal voltage representing the electric charge produced by the opto-electric conversion section from the electric-charge holding section as a signal level at a signal-level read time and for computing a difference between the signal level and the reset level in order to generate a pixel signal; and control means for controlling an operation to provide the unit pixel with a pixel driving signal driving the unit pixel but affecting a coupling phenomenon occurring in the electric-charge holding section so as to make:

the state of the pixel driving signal at a first reset time at which the electric-charge holding section is reset immediately prior to a transfer of electric charge from the opto-electric conversion section to the electric-charge holding section the same as the state of the pixel driving signal at a second reset time at which the electric-charge holding section is reset immediately prior to an operation to read out the reset level from the electric-charge holding section; and the state of the pixel driving signal at the signal-level read time the same as the state of the pixel driving signal at the reset-level read time.

In accordance with the second embodiment of the present invention, in an electronic apparatus including a plurality of unit pixels each having an opto-electric conversion section configured to convert incident light into electric charge and an electric-charge holding section configured to hold a signal voltage representing the electric charge produced by the opto-electric conversion section:

a reset voltage appearing on the electric-charge holding section as a result of setting the electric-charge holding section at a predetermined voltage is read out from the electric-charge holding section as a reset level at a reset-level read time after the signal voltage representing the electric charge produced by the opto-electric conversion section has been read out from the electric-charge holding section as a signal level at a signal-level read time and, then, a difference between the signal level and the reset level is computed in order to generate a pixel signal; and an operation to provide the unit pixel with a pixel driving signal driving the unit pixel but affecting a coupling phenomenon occurring in the electric-charge holding section is controlled so as to make:

the state of the pixel driving signal at a first reset time at which the electric-charge holding section is reset immediately prior to a transfer of electric charge from the opto-electric conversion section to the electric-charge holding section the same as the state of the pixel driving signal at a second reset time at which the electric-charge holding section is reset immediately prior to an operation to read out the reset level from the electric-charge holding section; and the state of the pixel driving signal at the signal-level read time the same as the state of the pixel driving signal at the reset-level read time.

In the following description, the opto-electric conversion section is also referred to as an opto-electric conversion element.

In accordance with the first embodiment of the present invention, the coupling noise included in the pixel signal read out in a solid-state imaging device can be reduced. In addition, in accordance with the second embodiment of the present invention, the coupling noise included in the pixel signal read out in an electronic apparatus can also be reduced as well.

DETAILED DESCRIPTION OF THE PREFERRED EMBODIMENTS

Embodiments of the present invention are explained by referring to diagrams as follows.
Outline of the Invention A solid-state imaging device to which the present invention is applied employs a plurality of unit pixels each having at least a photodiode, a transfer gate, a reset transistor and a floating diffusion area which serves as an electric-charge holding section. In each of the unit pixels employed in the solid-state, imaging device, the photodiode carries out an opto-electric conversion process of converting light incident to the photodiode into electric charge which is then transferred from the photodiode to the floating diffusion area by way of the transfer gate. In the floating diffusion area, the electric charge appears as the voltage observed at the floating diffusion area. Then, the voltage appearing at the floating diffusion area is read out in the so-called CDS (Correlated Double Sampling) processing.

Figure 1:
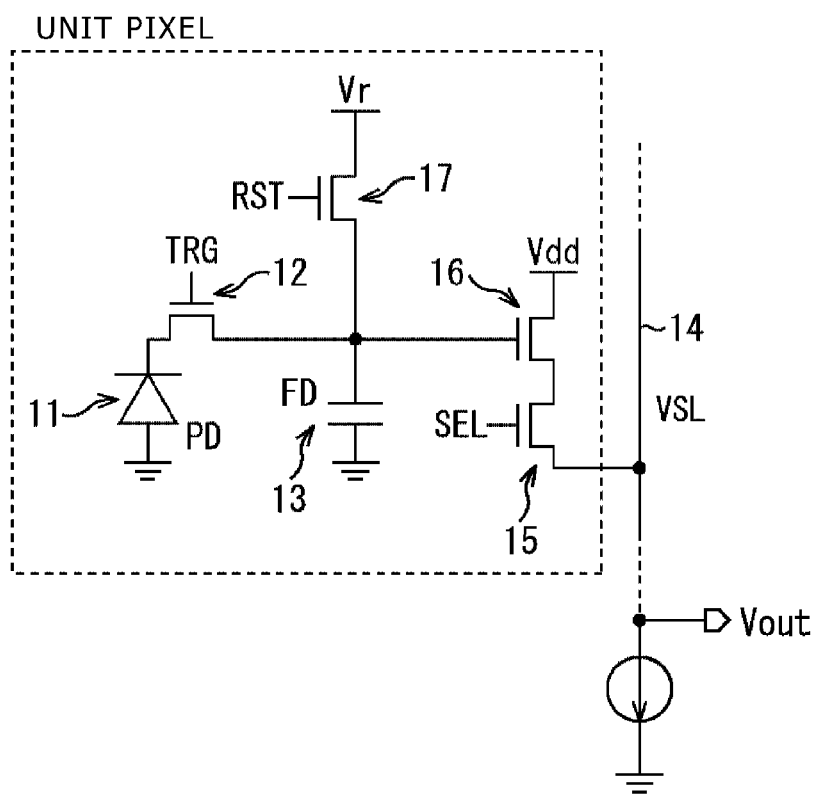
FIG. 1 is a circuit diagram showing the configuration of a unit pixel in related art.
Figure 2:
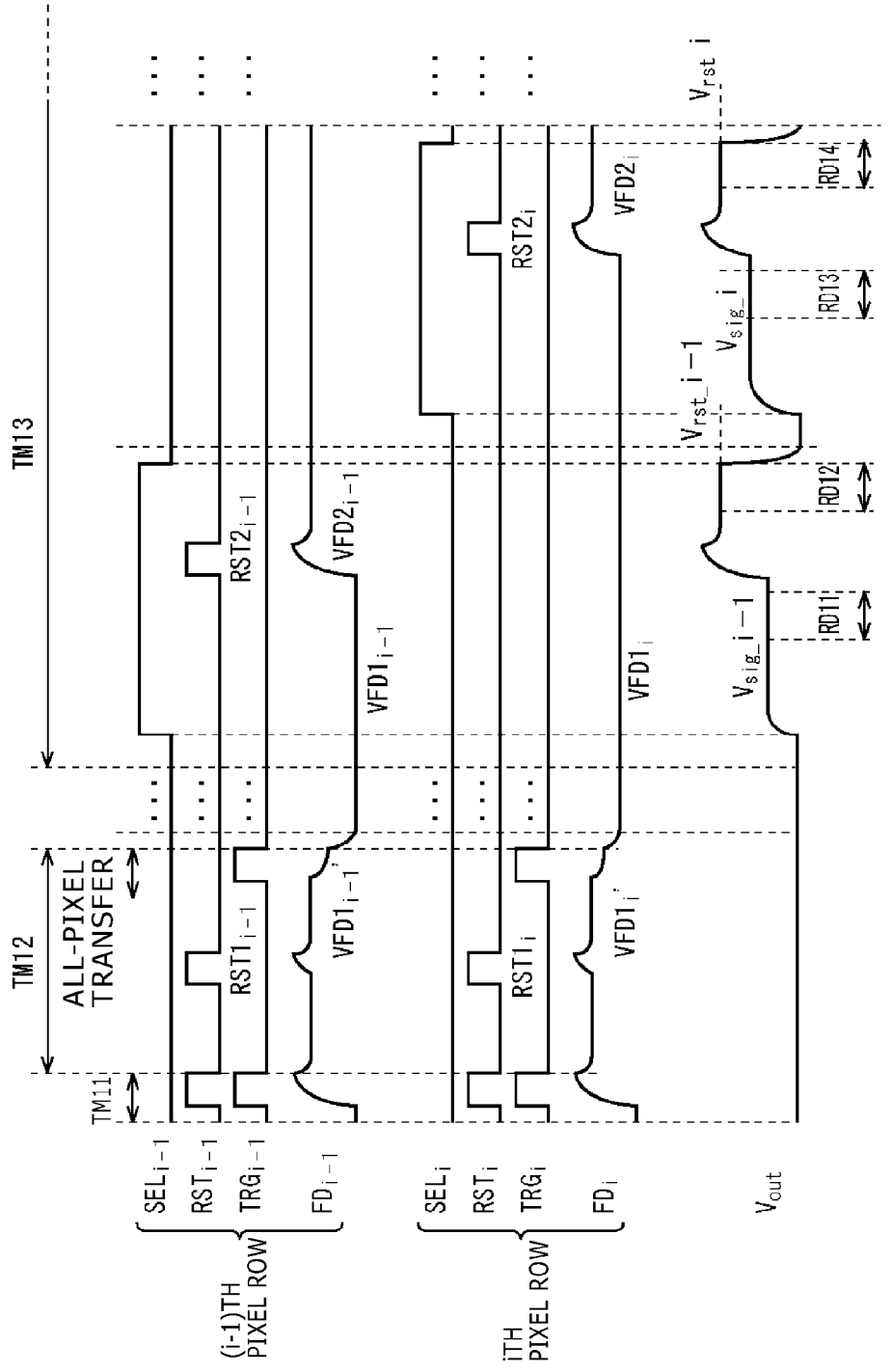
FIG. 2 is an explanatory timing diagram to be referred to in description of operations carried out by a solid-state imaging device in related art.
Figure 3:
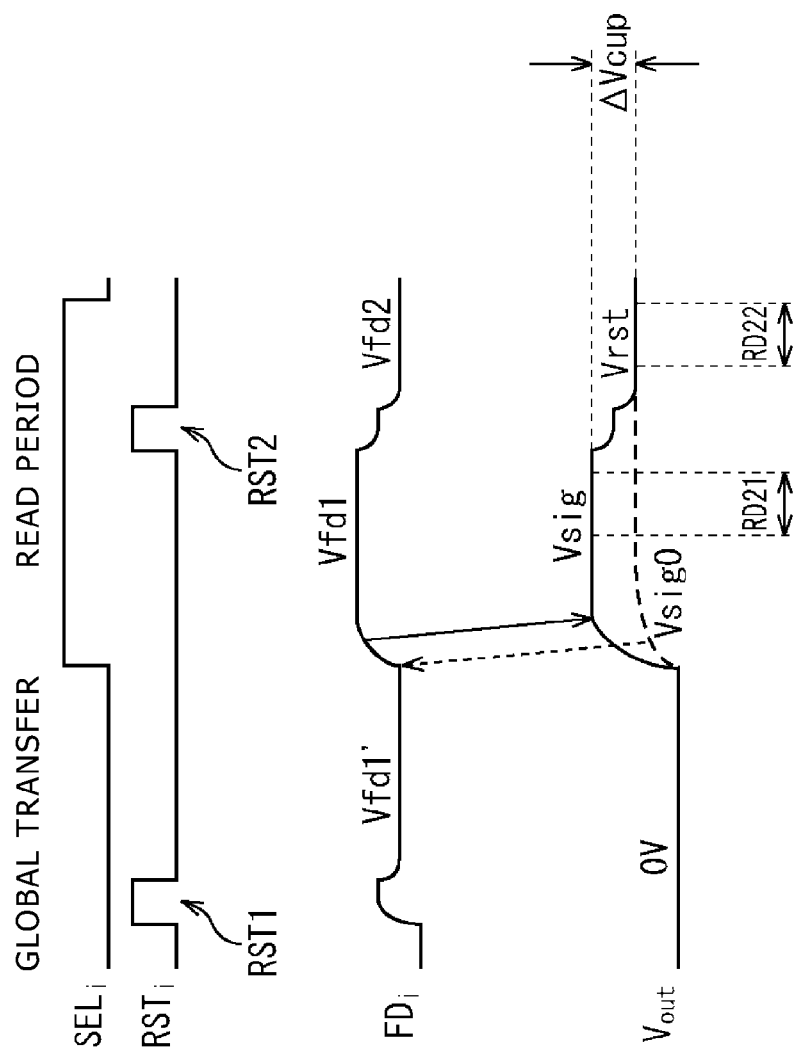
FIG. 3 is an explanatory timing diagram to be referred to in description of a coupling noise generated in a solid-state imaging device in related art.
Figure 4:
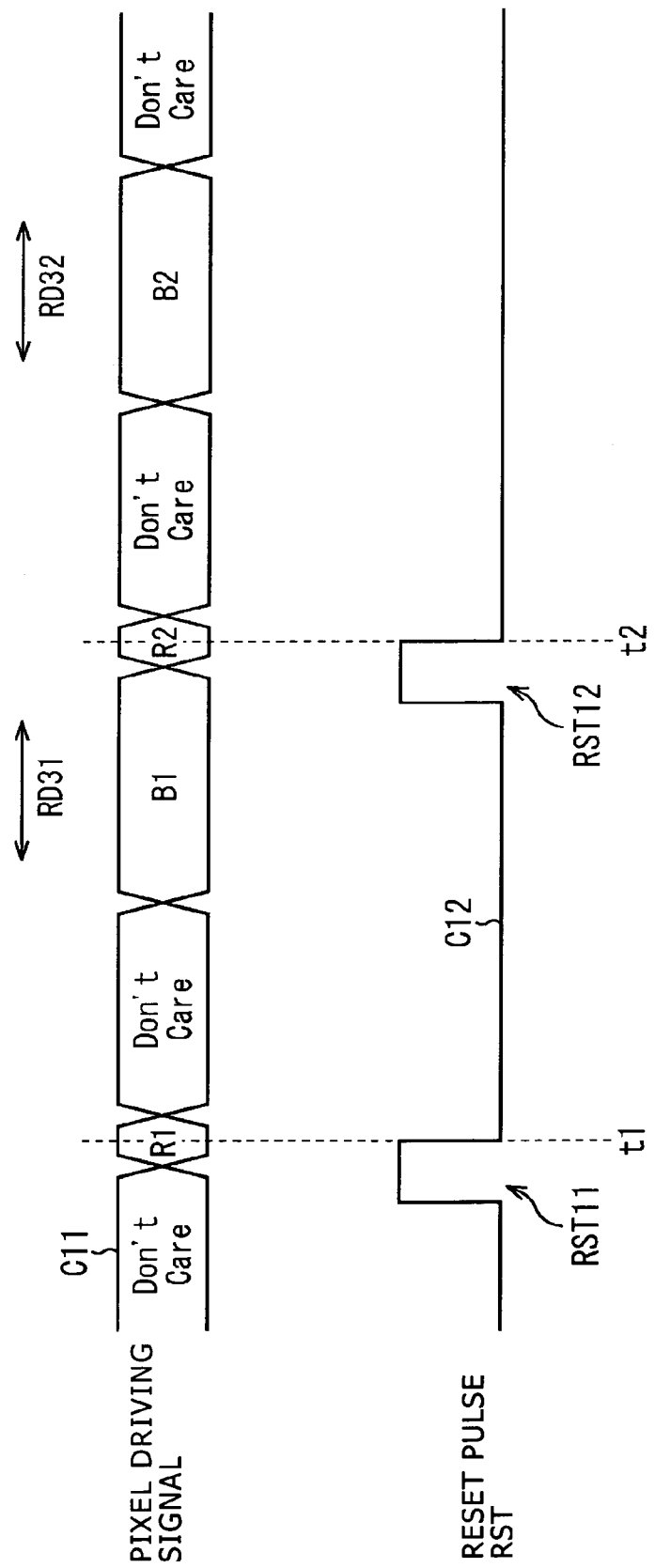
FIG. 4 is an explanatory timing diagram to be referred to in description of an outline of embodiments of the present invention.

In a unit pixel employed in the solid-state imaging device, a pixel driving signal for driving a predetermined pixel element included in the unit pixel is supplied to the pixel element as shown in FIG. 4. In the meantime, a reset pulse signal RST for driving the reset transistor in order to reset the floating diffusion area is supplied to the reset transistor as shown in the same figure. It is to be noted that the horizontal axis in the figure represents the lapse of time. In the figure, reference symbols C11 and C12 denote the waveforms of the pixel driving signal and the reset pulse signal RST respectively.

To put it more concretely, in an exposure period of a unit pixel employed in the solid-state imaging device, a reset pulse RST11 is once applied to the reset transistor in order to reset the floating diffusion area. Then, electric charge is transferred from the photodiode to the floating diffusion area at which the electric charge appears as a voltage. Subsequently, during a period RD31, the voltage appearing at the floating diffusion area is read out as a signal level. Later on, a reset pulse RST12 is applied to the reset transistor in order to again reset the floating diffusion area. Then, during a period RD32, a post-reset voltage appearing at the floating diffusion area already reset is read out as a reset level.

While the operations described above are being carried out, the solid-state imaging device controls the state of the pixel driving signal which has an effect on coupling between the floating diffusion area and another member such as another signal line or another element employed in the unit pixel. By controlling the state of the pixel driving signal, it is possible to reduce coupling noises generated by the coupling between the floating diffusion area and the other member. Typical examples of the pixel driving signal are a select pulse signal SEL applied to a select transistor employed in the unit pixel and a transfer pulse signal TRG supplied to the transfer gate.

To put it more concretely, the solid-state imaging device carries out control to make the state of the pixel driving signal in a portion R1 included in the waveform C11 of the pixel driving signal as shown in FIG. 4 the same as the state of the pixel driving signal in a portion R2 included in the waveform C11 of the pixel driving signal. It is to be noted that, as shown in the same figure, the time of the portion R1 coincides with the application time of the reset pulse RST11 applied to the reset transistor whereas the time of the portion R2 coincides with the application time of the reset pulse RST12 applied to the reset transistor.

To put it in more detail, a reset pulse RST is activated by raising the pulse from a low level to a high level and then deactivated by lowering the pulse from the high level to the low level. The transition of the reset pulse RST from a low level to a high level is referred to as the rising edge of the pulse whereas the transition of the reset pulse RST from a high level to a low level is referred to as the falling edge of the pulse. In other words, the reset pulse RST is a pulse between the rising and falling edges of the pulse.

The solid-state imaging device carries out control to make the state of the pixel driving signal at a time t1 the same as the state of the pixel driving signal at a time t2. The time t1 is the time of the falling edge of the reset pulse RST11 applied to the reset transistor whereas the time t1 is the time of the falling edge of the reset pulse RST12 applied to the reset transistor.

It is to be noted that the state of the pixel driving signal implies typically the level (or the voltage) of the signal. Thus, in this case, the solid-state imaging device carries out control to make the voltage of the pixel driving signal at the time t1 equal to the voltage of the pixel driving signal at the time t2.

In addition, besides the control to make the state of the pixel driving signal at the time t1 the same as the state of the pixel driving signal at the time t2, the solid-state imaging device also carries out control to make the state of the pixel driving signal at a portion B1 of the waveform C11 the same as the state of the pixel driving signal at a portion B2 of the waveform C11. The portion B1 is a portion appearing during the period RD31 of an operation to read out the signal level from the unit pixel. On the other hand, the portion B2 is a portion appearing during the period RD32 of an operation to read out the reset level from the unit pixel.

As described above, the solid-state imaging device carries out control to make the state of the pixel driving signal at a time at which the floating diffusion area is reset immediately before an operation to read out the signal level the same as the state of the pixel driving signal at a time at which the floating diffusion area is reset immediately before an operation to read out the reset level. The time at which the floating diffusion area is reset immediately before an operation to read out the signal level can be said to be a time at which the floating diffusion area is reset immediately before an operation to transfer electric charge from the photodiode to the floating diffusion area. In addition, the solid-state imaging device also carries out control to make the state of the pixel driving signal during the operation to read out the signal level the same as the state of the pixel driving signal during the operation to read out the reset level. By carrying out such control operations, it is possible to make the quantity of the coupling noise generated during the operation to read out the signal level about equal to the quantity of the coupling noise generated during the operation to read out the reset level. Thus, the effect of the coupling noise on the pixel signal can be reduced. As a result, it is possible to obtain a pixel signal having an accurate value.

First Embodiment

Configuration of the Solid-State Imaging Device

Next, a concrete embodiment of the present invention is explained.

Figure 5:
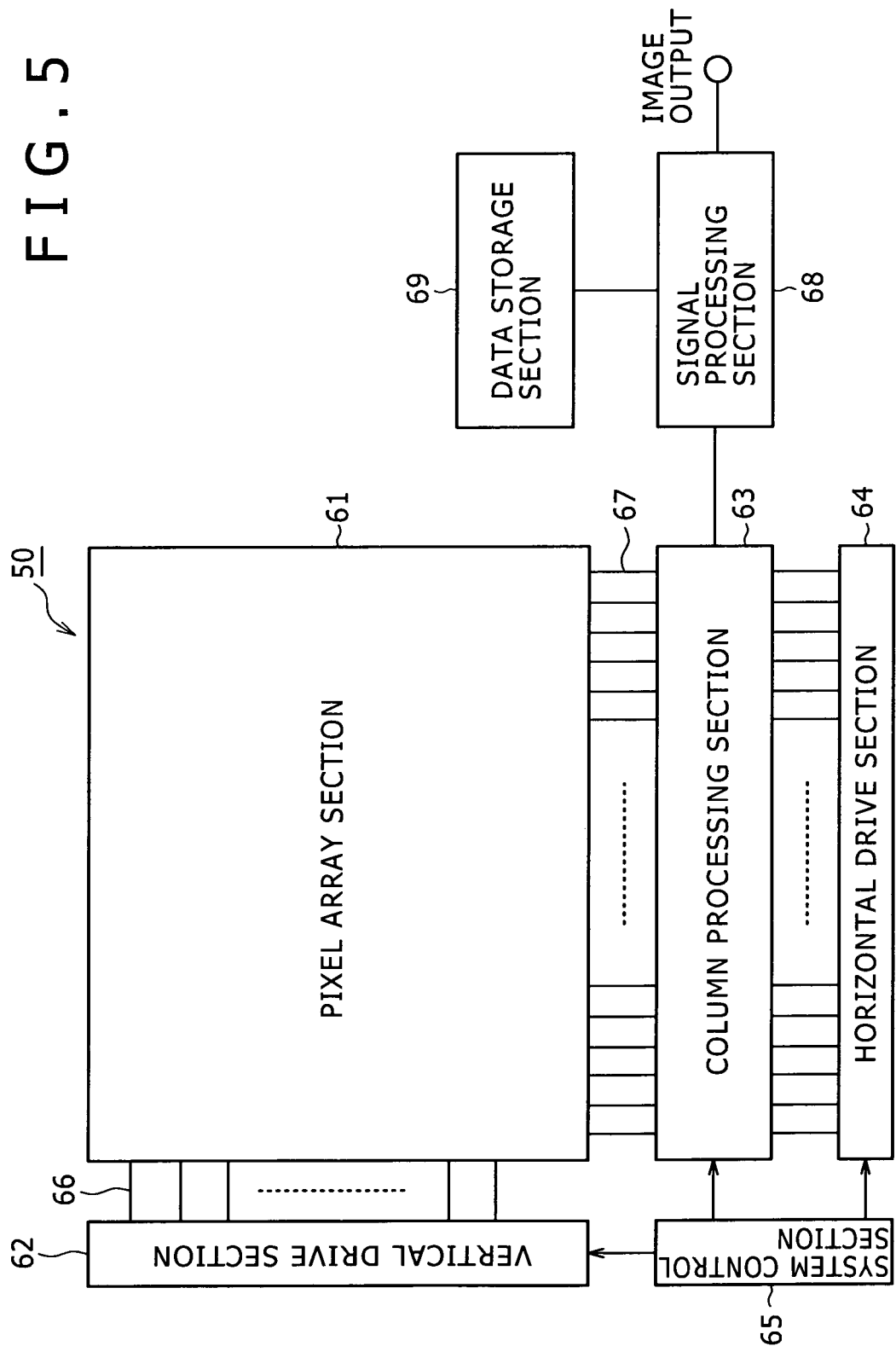
FIG. 5 is a block diagram showing a typical configuration of an embodiment implementing a solid-state imaging device to which an embodiment of the present invention is applied.

FIG. 5 is a block diagram showing a typical configuration of an embodiment implementing a CMOS (Complementary Metal Oxide Semiconductor) image sensor 50 used as a solid-state imaging device to which the present invention is applied.

The CMOS image sensor 50 is configured to include a pixel array section 61, a vertical drive section 62, a column processing section 63, a horizontal drive section 64 and a system control section 65. The pixel array section 61, the vertical drive section 62, the column processing section 63, the horizontal drive section 64 and the system control section 65 are created on a semiconductor substrate (or a chip) not shown in the figure.

Figure 6:
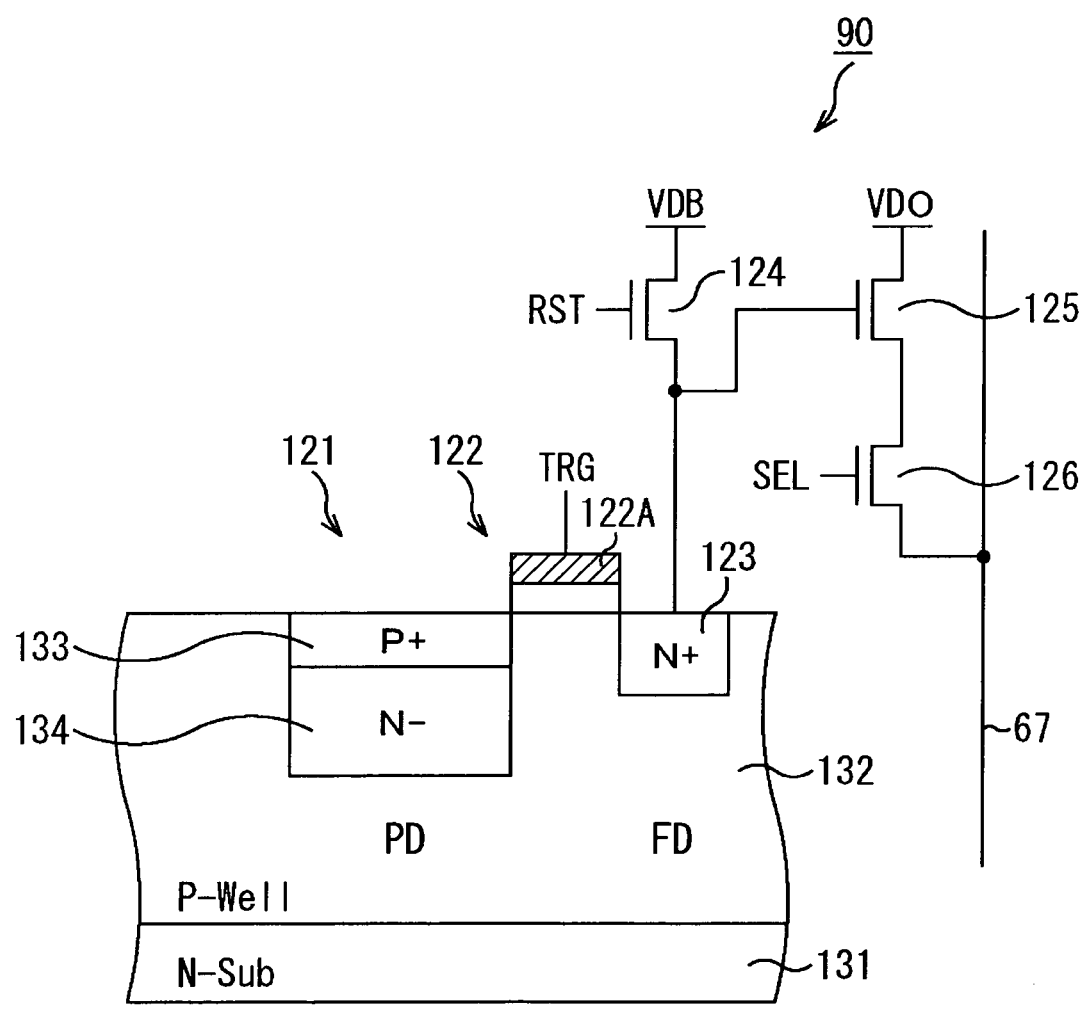
FIG. 6 is a diagram showing a typical configuration of a unit pixel according to a first embodiment of the present invention.

The pixel array section 61 has unit pixels 90 laid out two-dimensionally to form a matrix. As shown in FIG. 6, each of the unit pixels 90 employs an opto-electric conversion element for converting light incident to the opto-electric conversion element into opto-electric charge having an amount according to the quantity of the light and for accumulating the opto-electric charge therein. It is to be noted that, in the following description, the opto-electric charge having an amount according to the quantity of the incident light is also referred to simply as electric charge whereas the unit pixel is also referred to simply as a pixel.

In addition, the pixel array section 61 also includes a pixel driving line 66 provided for every pixel row of the matrix of the pixel array section 61. The pixel driving lines 66 are oriented in the pixel row direction which is the horizontal direction in the figure. The pixel array section 61 also includes a vertical signal line 67 provided for every pixel column of the matrix of the pixel array section 61. The vertical signal lines 67 are oriented in the column direction which is the vertical direction in the figure. FIG. 5 shows one pixel driving line 66 for every pixel row. In actuality, however, the number of pixel driving lines 66 provided for every pixel row is by no means limited to 1. One end of the pixel driving line 66 is connected to one of output terminals employed in the vertical drive section 62. The output terminal is associated with a pixel row for which the pixel driving line 66 connected to the output terminal is provided.

The CMOS image sensor 50 also employs a signal processing section 68 and a data storage section 69. The signal processing section 68 and the data storage section 69 can be an external signal processing apparatus provided on a substrate other than the semiconductor substrate for the CMOS image sensor 50 or an internal signal processing apparatus provided on the same semiconductor substrate as the CMOS image sensor 50. A typical example of the signal processing apparatus is a DSP (Digital Signal Processor) or a signal processing apparatus for carrying out processing by execution of software.

The vertical drive section 62 is configured to include components such as a shift register and an address decoder. The vertical drive section 62 is a pixel driving section for driving all unit pixels in the pixel array section 61 typically at the same time or sequentially on a one-row-after-another basis. A concrete configuration of the vertical drive section 62 is not shown in the figure. In general, however, the vertical drive section 62 is configured to include a read scan system and a sweep scan system or include a configuration having a batch sweep function and a batch transfer function.

In order to read out signals from unit pixels, the read scan system sequentially scans and selects the unit pixels in the pixel array section 61 sequentially on a one-row-after-another basis. In the case of a pixel row driving operation, the sweep scan system carries out a sweep scan operation on a pixel row to be subjected to a read scan operation carried out by the read scan system. The sweep scan operation leads ahead of the read scan operation by a time period, the length of which is determined by the speed of a shutter. In the case of a global exposure operation, on the other hand, the batch sweep function is carried out at a time preceding the time, at which the batch transfer function is executed, by a time period, the length of which is determined by the speed of a shutter.

The sweep scan operation carried out by the sweep scan system or by execution of the batch sweep function sweeps unnecessary electric charge from an opto-electric conversion element employed in a unit pixel being subjected to the sweep scan operation, resetting the opto-electric conversion element. The sweep scan system or the batch sweep function sweeps (or resets) unnecessary electric charge in order to carry out the so-called electronic shutter operation. The electronic shutter operation is an operation to discard opto-electric charge of the opto-electric conversion element and newly start an exposure, that is, newly start accumulation of opto-electric charge.

A signal read out from an opto-electric conversion element employed in a unit pixel in a read operation carried out by the read scan system or by execution of the batch transfer function has a magnitude determined by the quantity of light incident to the opto-electric conversion element during the immediately preceding read operation or incident to the opto-electric conversion element since the electronic shutter operation. In the case of a pixel row driving operation carried out by making use of the read scan system, a period between the read timing of the immediately preceding read operation or the sweep timing of the electronic shutter operation and the read timing of the present read operation is referred to as the period of accumulation of opto-electric charge in the unit pixel. In the case of a global exposure operation carried out by execution of the batch transfer function, on the other hand, a period between a batch sweeping time and a batch transfer time is referred to as the period of accumulation of opto-electric charge in the unit pixel. In the following description, the period of accumulation of opto-electric charge is referred to as an exposure period.

Pixel signals read out from unit pixels on a pixel row selected and scanned by the vertical drive section 62 are supplied to the column processing section 63 for each pixel column through the vertical signal line 67. The column processing section 63 carries out signal processing determined in advance on the pixel signals output by unit pixels on the selected pixel row of the pixel array section 61 through the vertical signal lines 67 for every pixel row. The column processing section 63 also temporarily stores the pixel signals completing signal processing determined in advance in an internal memory.

To put it more concretely, the predetermined signal processing carried out by the column processing section 63 includes at least noise elimination processing such as CDS (Correlated Double Sampling) processing. The column processing section 63 carries out the CDS processing in order to eliminate reset noises and fixed pattern noises caused by, among others, variations in amplification-transistor threshold voltage to serve as noises inherent in the unit pixel. In addition to the function for eliminating noises, the column processing section 63 is also provided with typically an AD (analog-to-digital) conversion function for converting the analog signal level into a digital signal.

The horizontal drive section 64 is also configured to include components such as a shift register and an address decoder. The horizontal drive section 64 sequentially selects unit circuits each employed in the column processing section 63 as a circuit corresponding to a pixel column. The horizontal drive section 64 selects and scans the unit circuits in order to sequentially supply a signal completing the signal processing carried out by the column processing section 63 for every unit circuit to the signal processing section 68.

The system control section 65 includes a timing generator for generating a variety of timing signals. On the basis of the timing signals generated by the timing generator, the system control section 65 controls operations to drive sections such as the vertical drive section 62, the column processing section 63 and the horizontal drive section 64.

The signal processing section 68 has at least an addition processing function to be executed to carry out various kinds of processing including addition processing performed on a pixel signal output by the column processing section 63. The data storage section 69 is used for temporarily storing data, which is required in the signal processing carried out by the signal processing section 68, during the processing.

Configuration of the Unit Pixel

Next, the following description explains the concrete structure of each of unit pixels 90 laid out to form a matrix in the pixel array section 61 employed in the CMOS image sensor 50 shown in FIG. 5. In the unit pixel 90, a floating diffusion area (serving as a floating diffusion capacitor) is a section for holding (or accumulating) opto-electric charge transferred from an opto-electric conversion element.

FIG. 6 is a diagram showing a typical configuration of the unit pixel 90.

The unit pixel 90 has a PD (photodiode) 121 serving as an opto-electric conversion element. The photodiode 121 also denoted by reference symbol PD in the figure is typically an embedded-type photodiode composed of an N-type embedded layer 134 and a P-type layer 133 created on the N-type embedded layer 134. The N-type embedded layer 134 is a layer embedded in a P-type well layer 132 formed on an N-type substrate 131. The P-type layer 133 is a layer created on the N-type embedded layer 134, being exposed to the surface of the P-type well layer 132.

In addition to the photodiode 121, the unit pixel 90 also employs a transfer gate 122 and an FD (floating diffusion) area 123 also denoted by reference symbol FD in the figure. It is to be noted that the floating diffusion area 123 is shielded against incident light.

When a transfer pulse TRG is applied to the gate electrode 122A of the transfer gate 122, the transfer gate 122 transfers electric charge from the photodiode 121 to the floating diffusion area 123. The electric charge has been accumulated in the photodiode 121 as a result of a photo-electric conversion process carried out by the photodiode 121 to convert light incident to the photodiode 121 into the electric charge. The floating diffusion area 123 is an N-type layer serving as a section for converting the electric charge transferred by way of the transfer gate 122 from the photodiode 121 into a voltage.

In addition, the unit pixel 90 further has a reset transistor 124, an amplification transistor 125 and a select transistor 126. In the typical structure shown in FIG. 6, each of the reset transistor 124, the amplification transistor 125 and the select transistor 126 is an N-channel MOS transistor. However, the N-channel conduction type of each of the reset transistor 124, the amplification transistor 125 and the select transistor 126 is no more than a typical conduction type whereas the combination of the conduction types of the reset transistor 124, the amplification transistor 125 and the select transistor 126 is no more than a typical combination. That is to say, the conduction types of the reset transistor 124, the amplification transistor 125 and the select transistor 126 are by no means limited to the N-channel conduction type.

The reset transistor 124 is provided between a power supply VDB and the floating diffusion area 123. A reset pulse RST is applied to the gate electrode of the reset transistor 124 in order to reset the floating diffusion area 123. The drain electrode of the amplification transistor 125 is connected to a power supply VDO whereas the gate electrode of the amplification transistor 125 is connected to the floating diffusion area 123. Thus, the amplification transistor 125 reads out a voltage appearing at the floating diffusion area 123.

Typically, the drain electrode of the select transistor 126 is connected to the source electrode of the amplification transistor 125 whereas the source electrode of the select transistor 126 is connected to the vertical signal line 67. A select pulse SEL is applied to the gate electrode of the select transistor 126 in order to select this unit pixel 90 from which a pixel signal is to be read out. The reader is advised to keep in mind that it is also possible to adopt a configuration in which the select transistor 126 is provided between the power supply VDO and the drain electrode of the amplification transistor 125.

It is also to be noted that, depending on the method for reading out the pixel signal, one or more of the reset transistor 124, the amplification transistor 125 and the select transistor 126 can be omitted or the reset transistor 124, the amplification transistor 125 and the select transistor 126 can be shared by a plurality of unit pixels 90.

The CMOS image sensor 50 having the configuration described above starts an exposure period for all unit pixels 90 at the same time and ends the exposure period also for all the unit pixels 90 at the same time. In the exposure period, electric charge accumulated in the photodiode 121 is transferred to the floating diffusion area 123 in order to implement the so-called global exposure operation. By carrying out the global exposure operation in the exposure period uniform for all the unit pixels 90, an imaging operation generating no distortions can be implemented.

It is to be noted that the technical term 'all unit pixels 90' used in the description of the embodiments implies all unit pixels 90 in the pixel array section 61 on which an image is created. Thus, the technical term 'all unit pixels 90' is not intended to include dummy pixels and the like. In addition, if the time difference and/or the image distortion are sufficiently small so as to raise no problem, in place of an operation carried out at the same time for all unit pixels 90, an operation such as a scan operation can also be carried out for every plurality of pixel rows at a high speed. For example, a scan operation can also be carried out for each several tens of pixel rows.

Next, the following description explains the global exposure operation carried out on unit pixels 90.

First of all, after an electric-charge discarding operation has been carried out in order to discard electric charge accumulated in the photodiode 121 so as to make the photodiode 121 empty for all unit pixels 90 at the same time, the exposure operation is started. That is to say, a transfer pulse TRG is applied to the gate electrode 122A of the transfer gate 122 and a reset pulse RST is applied to the gate electrode of the reset transistor 124 in order to reset the photodiode 121 and the floating diffusion area 123 at the start of the exposure operation.

In the exposure operation, opto-electric charge is accumulated in a PN junction capacitor of the photodiode 121. At the end of the exposure operation, the transfer gate 122 is turned on for all unit pixels 90 at the same time in order to transfer all opto-electric charge accumulated in the photodiode 121 to the floating diffusion area 123. Then, when the transfer gate 122 is turned off for all unit pixels 90 at the same time, all opto-electric charge accumulated in the photodiode 121 during the exposure operation has been held in the floating diffusion area 123.

Afterward, a voltage appearing at the floating diffusion area 123 to represent opto-electric charge held in the floating diffusion area 123 is transferred to the column processing section 63 through the vertical signal line 67 as a signal level by applying a select pulse SEL to the gate electrode of the select transistor 126. Then, the floating diffusion area 123 is reset. After the floating diffusion area 123 has been reset, a voltage appearing at the floating diffusion area 123 to represent electric charge left in the floating diffusion area 123 is transferred to the column processing section 63 through the vertical signal line 67 as a reset level by applying a select pulse SEL to the gate electrode of the select transistor 126. The operations to transfer the signal and reset levels are carried out sequentially on a one-row-after-another basis.

It is to be noted that, in the following description, an operation to apply a transfer pulse TRG to the gate electrode 122A in order to turn on the transfer gate 122, a reset pulse RST to the gate electrode of the reset transistor 124 in order to turn on the reset transistor 124 or a select pulse SEL to the gate electrode of the select transistor 126 in order to turn on the select transistor 126 is referred to simply as an operation to turn on or activate the transfer pulse TRG, the reset pulse RST or the select pulse SEL respectively. On the other hand, an operation to remove a transfer pulse TRG from the gate electrode 122A in order to turn off the transfer gate 122, a reset pulse RST from the gate electrode of the reset transistor 124 in order to turn off the reset transistor 124 or a select pulse SEL from the gate electrode of the select transistor 126 in order to turn off the select transistor 126 is referred to simply as an operation to turn off or deactivate the transfer pulse TRG, the reset pulse RST or the select pulse SEL respectively.

Reduction of Coupling Noises

By the way, as explained before by referring to FIG. 4, in the CMOS image sensor 50, the vertical drive section 62 properly controls the pixel driving signal for driving the unit pixels 90 in order to reduce the quantity of the coupling noise included in each pixel signal read out from the unit pixel 90.

In the following description, the pixel driving signal is assumed to be the select pulse SEL applied to the gate electrode of the select transistor 126 through the pixel driving line 66.

Figure 7:
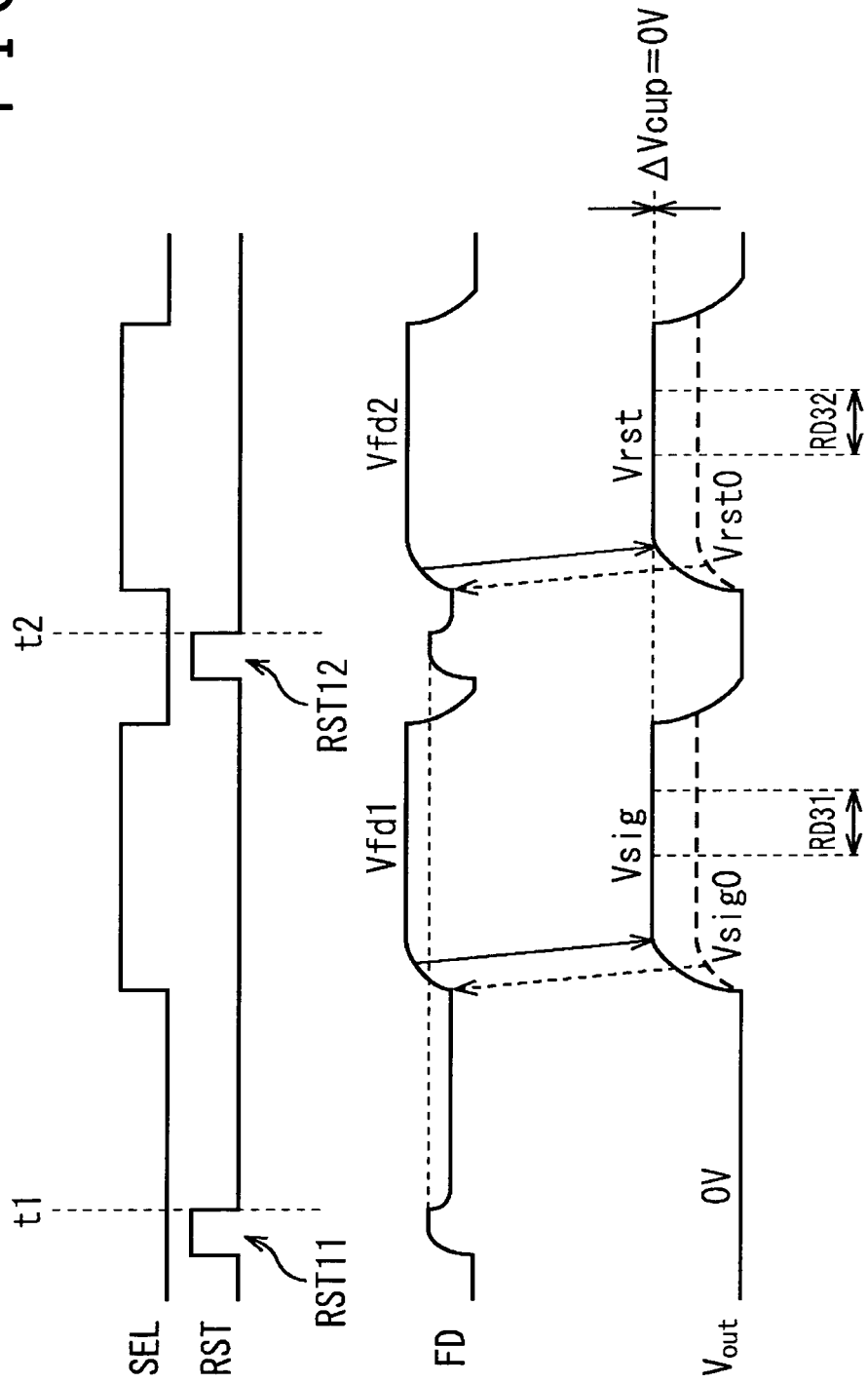
FIG. 7 is an explanatory timing diagram to be referred to in description of operations carried out by the solid-state imaging device according to the first embodiment of the present invention.

With the select pulse SEL serving as a pixel driving signal, the vertical drive section 62 executes control to make the state of the select pulse SEL at a time t2 the same as the state of the select pulse SEL at a time t1 and make the state of the select pulse SEL in a period RD32 the same as the state of the select pulse SEL in a period RD31. As shown in FIG. 7, the time t1 is a time at which the reset pulse RST is deactivated before the period RD31 whereas the time t2 is a time at which the reset pulse RST is deactivated before the period RD32. On the other hand, the period RD31 is a period during which the signal level is read out whereas the period RD32 is a period during which the reset level is read out.

It is to be noted that, in FIG. 7, the horizontal axis represents the lapse of time. In FIG. 7, portions identical with their respective counterparts shown in FIG. 4 are denoted by the same reference symbols as the counterparts. In addition, reference symbols SEL, RST, FD and $V_{out}$ shown in FIG. 7 denote the voltage of the select pulse SEL, the voltage of the reset pulse RST, the voltage appearing at the floating diffusion area 123 and the voltage appearing on the vertical signal line 67 respectively. On top of that, in order to make explanation with reference to FIG. 7 easy to understand, signal electric charge is assumed to be a dark-time signal which is a signal generated at a dark time. A dark time is a period during which there is essentially no transfer of electric charge from the photodiode 121 to the floating diffusion area 123.

In FIG. 7, while the select pulse SEL is sustained in a deactivated state, that is, while the waveform of the select pulse SEL is pulled down to a low level, the voltage appearing at the floating diffusion area 123 to represent electric charge held in the floating diffusion area 123 is not read out. When the voltage of the floating diffusion area 123 is not read out, the voltage $V_{out}$ is set at 0 V.

With the select pulse SEL sustained in a deactivated state, when a reset pulse RST11 is supplied to the gate electrode of the reset transistor 124 as a reset pulse RST in a simultaneous exposure operation carried out on the unit pixel 90, the floating diffusion area 123 is reset and the voltage FD appearing at the floating diffusion area 123 rises to a level to be described below. At a time t1 on the falling edge of the reset pulse RST11, the select pulse SEL is put in a turned-off state or at a low level.

Then, at the end of the simultaneous exposure operation carried out on the unit pixel 90, the select pulse SEL is turned on. When the select pulse SEL is turned on, the waveform of the select pulse SEL rises to a high level to turn on the select transistor 126 whereas the voltage $V_{out}$ appearing on the vertical signal line 67 makes an attempt to rise from 0 V to a level Vsig0.

As described before, the floating diffusion area 123 is connected to the gate electrode of the amplification transistor 125 whereas the vertical signal line 67 is connected to the source electrode of the amplification transistor 125 through the select transistor 126. Thus, when the voltage $V_{out}$ makes an attempt to rise from 0 V to the level Vsig0, due to a coupling feed through effect, the voltage FD appearing at the floating diffusion area 123 is modulated, rising to a level Vfd1. When the voltage FD appearing at the floating diffusion area 123 rises to the level Vfd1, the voltage $V_{out}$ appearing on the vertical signal line 67 actually rises further from the level Vsig0 to a level Vsig determined by the level Vfd1 of the voltage FD. Thus, during the period RD31, the level Vsig of the voltage $V_{out}$ is transferred to the column processing section 63 as the signal level.

After the signal level has been read out, on the other hand, the vertical drive section 62 temporarily turns off (or deactivates) the select pulse SEL. When the vertical drive section 62 turns off the select pulse SEL, the voltage $V_{out}$ appearing on the vertical signal line 67 decreases from the level Vsig to 0 V whereas the voltage FD appearing at the floating diffusion area 123 also decreases from the level Vfd1 to 0 V as well.

Afterwards, while sustaining the select pulse SEL in a turned-off state as it is, the vertical drive section 62 supplies a reset pulse RST12 to the gate electrode of the reset transistor 124 as a reset pulse RST. That is to say, the reset pulse RST is turned on or activated. Thus, the floating diffusion area 123 is reset and the voltage FD appearing at the floating diffusion area 123 rises to a level to be described below.

It is to be noted that, at that time, since the vertical drive section 62 sustains the select pulse SEL in a turned-off state as it is, the voltage $V_{out}$ appearing on the vertical signal line 67 is also sustained at 0 V as it is. In addition, at a time t2 on the falling edge of the reset pulse RST12, the select pulse SEL is also sustained at 0 V representing the turned-off state as it is.

Then, the vertical drive section 62 again turns on the select pulse SEL in order to read out the reset level. When the select pulse SEL is turned on, the waveform of the select pulse SEL rises to a high level to turn on the select transistor 126 whereas the voltage $V_{out}$ appearing on the vertical signal line 67 makes an attempt to rise from 0 V to a level Vrst0.

Also in this case, in the same way as the operation to read out the signal level, when the voltage $V_{out}$ makes an attempt to rise from 0 V to the level Vrst0, due to a coupling feed through effect, the voltage FD appearing at the floating diffusion area 123 is modulated, rising to a level Vfd2. When the voltage FD appearing at the floating diffusion area 123 rises to the level Vfd2, the voltage $V_{out}$ appearing on the vertical signal line 67 actually rises further from the level Vrst0 to a level Vrst determined by the level Vfd2 of the voltage FD. Thus, during the period RD32, the level Vrst of the voltage $V_{out}$ is transferred to the column processing section 63 as the reset level.

As described above, in the CMOS image sensor 50, the signal and reset levels are read out from the unit pixel 90 during the periods RD31 and RD32 respectively. Immediately prior to the period RD31 to read out the signal level, in the CMOS image sensor 50, the select pulse SEL is properly controlled to change from 0 V prevailing at the time t1 to the activated high-level state also sustained during the period RD31. By the same token, immediately prior to the period RD32 to read out the reset level, in the CMOS image sensor 50, the select pulse SEL is properly controlled to change also from 0 V prevailing at the time t2 to the activated high-level state also sustained during the period RD33. Thus, the voltage $V_{out}$ appearing on the vertical signal line 67 makes a transition from 0 V to the voltage Vsig under approximately the same condition as the transition of the voltage $V_{out}$ from 0 V to the voltage Vrst.

In the typical example shown in FIG. 7, when the select pulse SEL is activated immediately prior to the operation to read out the signal level, the voltage $V_{out}$ appearing on the vertical signal line 67 makes a transition from 0 V to the voltage Vsig0. When the select pulse SEL is activated immediately prior to the operation to read out the reset level, on the other hand, the voltage $V_{out}$ appearing on the vertical signal line 67 makes a transition from 0 V to the voltage Vrst0.

In this case, since the voltage Vsig0 has the same level as the voltage Vrst0, the magnitude of the coupling effect experienced by the floating diffusion area 123 in the operation to read out the signal level is equal to the magnitude of the coupling effect experienced by the floating diffusion area 123 in the operation to read out the reset level. Thus, the quantity of the coupling noise included in the signal level is equal to the quantity of the coupling noise included in the reset level. As a result, in the case of a dark-time signal, the voltage $V_{out}$ (=Vsig) read out as the signal level is equal to the voltage $V_{out}$ (=Vrst) read out as the reset level, and the difference ΔVcup between the signal and reset levels is 0 V. The difference ΔVcup is the quantity of the coupling noise included in the pixel signal. That is to say, if the difference between the signal and reset levels is found in order to obtain the pixel signal, the coupling noise included in the reset level cancels the coupling noise included in the signal level. Thus, a more accurate value of the pixel signal can be found.

As described above, in the CMOS image sensor 50, the state of the select pulse SEL set with the reset pulse RST12 activated is made the same as the state of the select pulse SEL set with the reset pulse RST11 activated. In addition, the state of the select pulse SEL set during the period RD32 to read out the reset level from the floating diffusion area 123 is made the same as the state of the select pulse SEL set during the period RD31 to read out the signal level from the floating diffusion area 123. Thus, the effect of the coupling noise can be further reduced.

Explanation of the Imaging Processing

Figure 8:
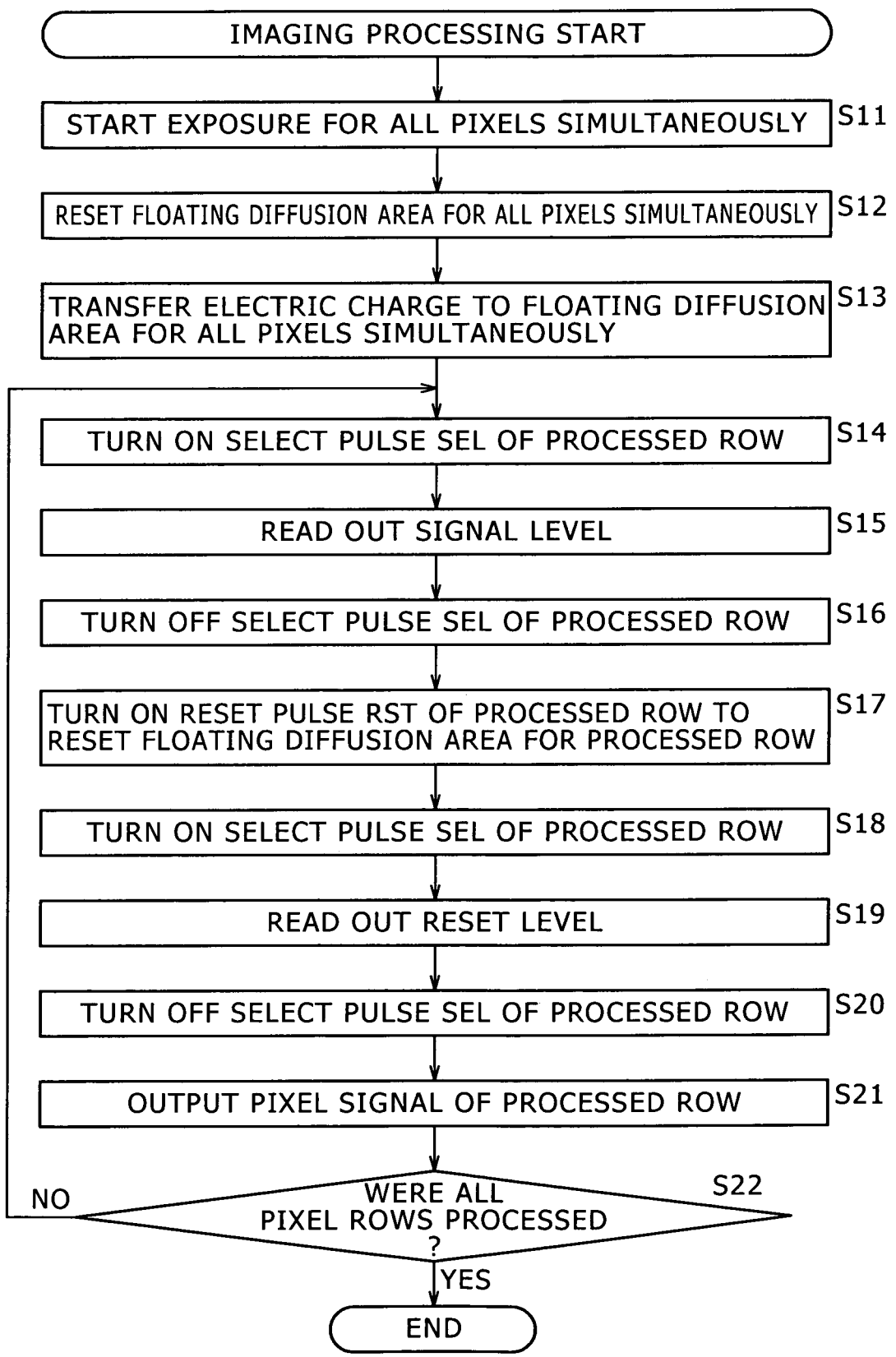
FIG. 8 shows an explanatory flowchart to be referred to in description of imaging processing.

Next, by referring to a flowchart shown in FIG. 8, the following description explains imaging processing carried out by the CMOS image sensor 50 to take an image in accordance with typically an operation carried out by the user.

The flowchart begins with a step S11 at which the vertical drive section 62 carries out an electronic shutter operation by starting an exposure operation for all unit pixels 90 at the same time. That is to say, the vertical drive section 62 applies a reset pulse RST to the gate electrode of the reset transistor 124 and a transfer pulse TRG to the gate electrode 122A of the transfer gate 122 for all unit pixels 90 at the same time.

Thus, electric charge accumulated so far in the photodiode 121 is discarded and, the photodiode 121 converts light, which is received from an imaging object after the electronic shutter operation has been carried out, into electric charge and stores the electric charge in the PN junction capacitor of the photodiode 121.

In addition, at that time, the vertical drive section 62 turns off the select pulse SEL applied to the gate electrode of the select transistor 126 employed in the unit pixel 90.

Then, at the next step S12, the vertical drive section 62 resets the floating diffusion area 123 employed in the unit pixel 90 in order to discard electric charge accumulated in the floating diffusion area 123 for all unit pixels 90 at the same time. The vertical drive section 62 resets the floating diffusion area 123 by turning on the reset pulse RST applied to the gate electrode of the reset transistor 124 employed in the unit pixel 90.

Subsequently, at the next step S13, the vertical drive section 62 turns on the transfer pulse TRG supplied to the gate electrode 122A of the transfer gate 122 in order to transfer electric charge accumulated in the photodiode 121 to the floating diffusion area 123 by way of the transfer gate 122 for all unit pixels 90 at the same time. The floating diffusion area 123 converts the electric charge transferred from the photodiode 121 into a voltage and holds the voltage.

Then, at the next step S14, the vertical drive section 62 turns on the select pulse SEL supplied to the gate electrode of the select transistor 126 for a plurality of unit pixels 90 on a pixel row selected among all pixel rows as a row to be processed. By turning on the select pulse SEL, the voltage appearing at the floating diffusion area 123 can be read out.

Subsequently, at the next step S15, the column processing section 63 reads out the voltage appearing at the floating diffusion area 123 through the vertical signal line 67, the select transistor 126 and the amplification transistor 125 as a signal level for the unit pixels 90 on the pixel row being processed.

Then, at the next step S16, the vertical drive section 62 turns off the select pulse SEL supplied to the gate electrode of the select transistor 126 for the unit pixels 90 on the pixel row being processed.

Subsequently, at the next step S17, the vertical drive section 62 turns on the reset pulse RST supplied to the gate electrode of the reset transistor 124 in order to reset the floating diffusion area 123 to a voltage determined in advance for the unit pixels 90 on the pixel row being processed.

Then, at the next step S18, the vertical drive section 62 turns on the select pulse SEL supplied to the gate electrode of the select transistor 126 for the unit pixels 90 on the pixel row being processed.

Subsequently, at the next step S19, the column processing section 63 reads out the voltage appearing at the floating diffusion area 123 through the vertical signal line 67, the select transistor 126 and the amplification transistor 125 as a reset level for the unit pixels 90 on the pixel row being processed.

Then, at the next step S20, the vertical drive section 62 turns off the select pulse SEL supplied to the gate electrode of the select transistor 126 for the unit pixels 90 on the pixel row being processed.

Subsequently, at the next step S21, the column processing section 63 finds the difference between the signal and reset levels, outputting the difference as a pixel signal to the signal processing section 68 for the unit pixels 90 on the pixel row being processed. The pixel signal output in this way is handled as data of the unit pixels 90 composing the pixel row of an image of the imaging object.

Then, at the next step S22, the CMOS image sensor 50 determines whether or not all the pixel rows composing the pixel array section 61 have been processed. If the CMOS image sensor 50 determines at the step S22 that not all the pixel rows composing the pixel array section 61 have been processed, the flow of the imaging processing goes back to the step S14 in order to repeat the execution of the processes at the steps described above. That is to say, the processes described above are carried out again on a newly selected pixel row in order to output a pixel signal for unit pixels 90 on the newly selected pixel row.

If the CMOS image sensor 50 determines at the step S22 that all the pixel rows composing the pixel array section 61 have been processed, on the other hand, the execution of the imaging processing is ended.

As described above, the CMOS image sensor 50 carries out an electronic shutter operation for all unit pixels 90 at the same time in order to take an image of an imaging object. In addition, in the operation to read out pixel signals for the image, the CMOS image sensor 50 properly controls the select pulse SEL used as a pixel driving signal in order to reduce coupling noises included in the pixel signals.

As described above, the operation to read out a pixel signal is carried out for every pixel row on a one-row-after-another basis. It is to be noted, however, that the operation to read out a pixel signal can also be carried out for every unit pixel 90 or every plurality of unit pixels 90.

First Modified Version

Reduction of Coupling Noises

As described above, the level of a voltage which appears on the vertical signal line 67 when the select pulse SEL is turned off is assumed to be 0 V. However, the level of a voltage appearing on the vertical signal line 67 with the select pulse SEL turned off can also be assumed to be Vini which is closer to the reset level of the floating diffusion area 123.

By setting the vertical signal line 67 at the voltage Vini with the select pulse SEL turned off, when the select pulse SEL is turned on, the voltage $V_{out}$ appearing on the vertical signal line 67 rises to a high level from the voltage Vini. Since the voltage Vini is closer to the reset level of the floating diffusion area 123, the increase of the voltage $V_{out}$ appearing on the vertical signal line 67 to the high level is small. Thus, the coupling voltage can also be made smaller as well. That is to say, the coupling-noise quantity itself can be reduced. It is to be noted that the voltage Vini asserted on the vertical signal line 67 can be set at a proper level by an internal or external voltage generator.

Figure 9:
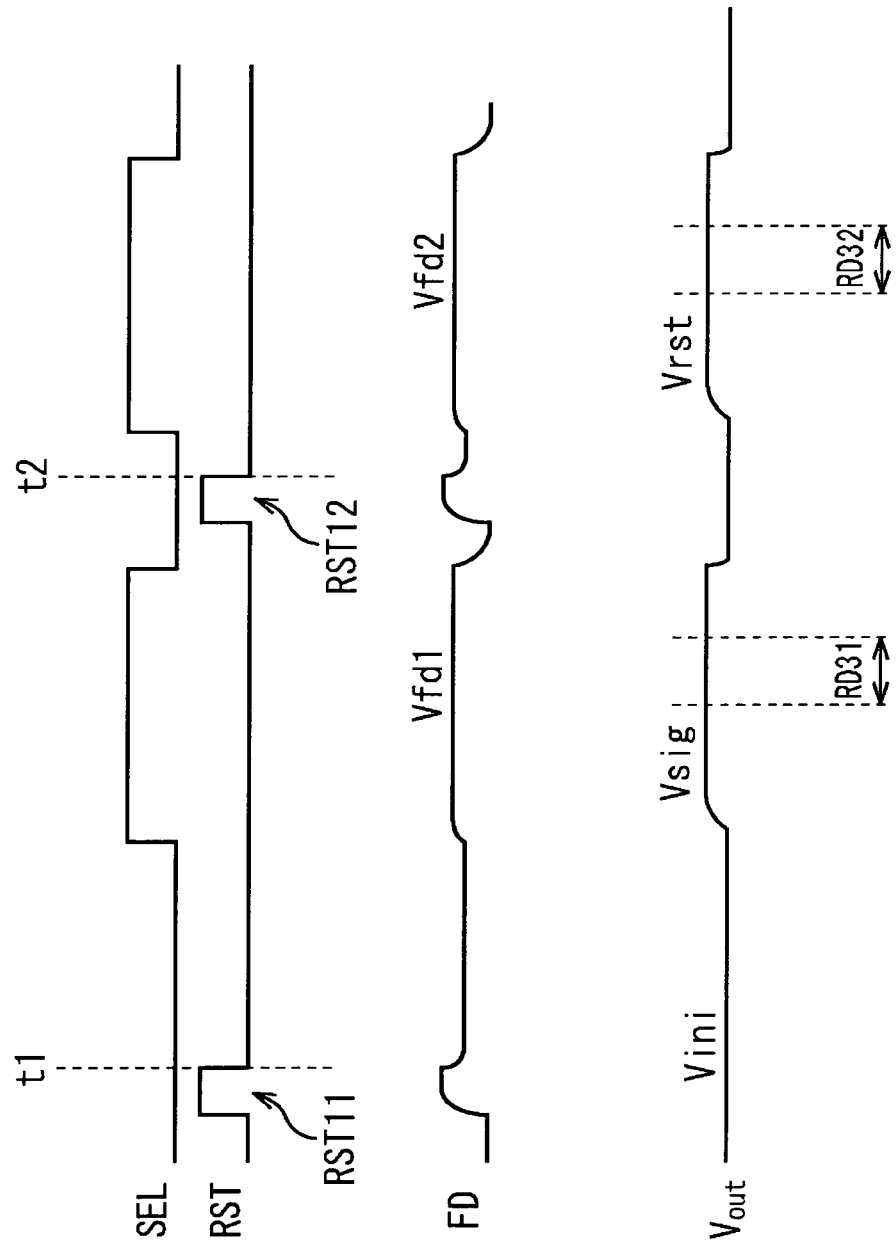
FIG. 9 is an explanatory timing diagram to be referred to in description of operations carried out by the solid-state imaging device to which the embodiment of the present invention is applied.

FIG. 9 is an explanatory timing diagram showing typical control in which, with the select pulse SEL turned off, the voltage $V_{out}$ appearing on the vertical signal line 67 is set at the voltage Vini (that is, $V_{out}$=Vini) as described above. Also in this typical control, the vertical drive section 62 changes the states of the select pulse SEL and the reset pulse RST in the same way as the typical control shown in FIG. 7.

It is to be noted that, in FIG. 9, the horizontal axis represents the lapse of time. In FIG. 9, portions identical with their respective counterparts shown in FIG. 7 are denoted by the same reference symbols as the counterparts. In addition, reference symbols SEL, RST, FD and $V_{out}$ shown in FIG. 9 denote the voltage of the select pulse SEL, the voltage of the reset pulse RST, the voltage appearing at the floating diffusion area 123 and the voltage appearing on the vertical signal line 67 respectively. On top of that, in order to make explanation with reference to FIG. 9 easy to understand, signal electric charge is assumed to be a dark-time signal.

The waveforms of the select pulse SEL and the reset pulse RST shown in FIG. 9 are identical with respectively the waveforms of the select pulse SEL and the reset pulse RST shown in FIG. 7. That is to say, the vertical drive section 62 controls the select transistor 126 and the reset transistor 124 in exactly the same way as the typical configuration explained earlier by referring to FIG. 7.

In the case of the typical configuration shown in FIG. 9, however, the level of the voltage appearing on the vertical signal line 67 with the select pulse SEL turned off is set at Vini which is higher than 0 V. By setting the vertical signal line 67 at the voltage Vini with the select pulse SEL turned off, when the select pulse SEL is turned on, the voltage $V_{out}$ appearing on the vertical signal line 67 rises to a high level Vsig or Vrst from the voltage Vini. Since the voltage Vini is higher than 0 V, the increase of the voltage $V_{out}$ appearing on the vertical signal line 67 to the high level is small. Thus, the quantity of the coupling noise can be reduced by a difference corresponding to the reduction of the increase in $V_{out}$. As a result, the effect of the coupling noise included in the pixel signal can be further decreased. It is to be noted that, in the case of the typical configuration shown in FIG. 9, the increase of the voltage $V_{out}$ from the voltage Vini to the high level Vsig is assumed to be equal to the increase of the voltage $V_{out}$ from the voltage Vini to the high level Vrst.

Second Embodiment

Configuration of the Unit Pixel

It is to be noted that each unit pixel 90 can also be provided with an overflow gate for preventing a blooming phenomenon to be described later. In this case, the unit pixel 90 typically has a configuration shown in FIG. 10. It is to be noted that, in the configuration shown in FIG. 10, components identical with their respective counterparts employed in the configuration shown in FIG. 6 are denoted with the same reference numerals and reference symbols as the counterparts and the explanation of the identical components is omitted if such explanation is not required.

Figure 10:
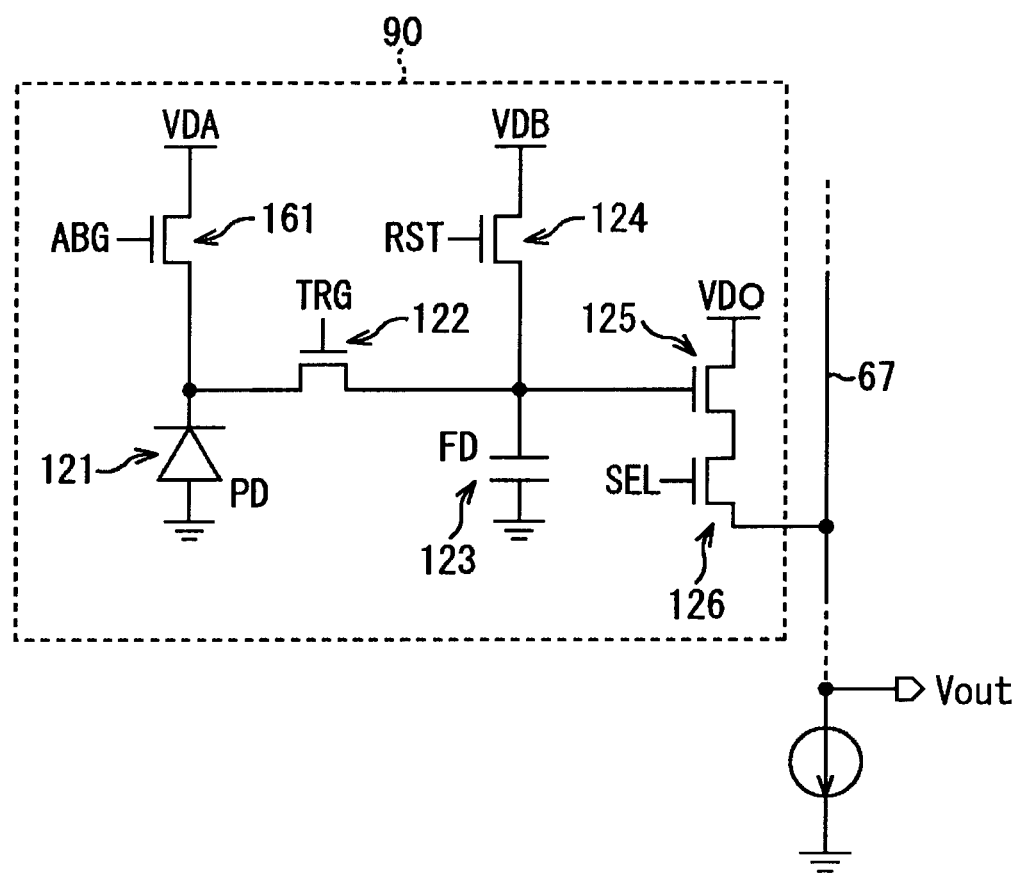
FIG. 10 is a diagram showing a typical configuration of a unit pixel according to a second embodiment of the present invention.

In addition to the components employed in the unit pixel 90 shown in FIG. 6, the unit pixel 90 shown in FIG. 10 also has an overflow gate 161 which is typically a transistor. In the unit pixel 90 shown in FIG. 10, the overflow gate 161 is provided between a power supply VDA and the photodiode 121. When the vertical drive section 62 supplies a control pulse ABG to the overflow gate 161 through the pixel driving line 66, the overflow gate 161 resets the photodiode 121. The overflow gate 161 resets the photodiode 121 by discarding electric charge accumulated in the photodiode 121.

Operation of the Overflow Gate

By the way, the overflow gate 161 is provided to prevent electric charge accumulated in the photodiode 121 from leaking out to the floating diffusion area 123. Thus, the overflow gate 161 normally operates ongoingly since a transfer of electric charge from the photodiode 121 to the floating diffusion area 123 till the operation to read out the pixel signal is completed.

In particular, a global exposure operation is an exposure operation carried out in order to transfer electric charge from the photodiode 121 to the floating diffusion area 123 for all unit pixels 90 at the same time. The electric charge accumulated in the floating diffusion area 123 is held therein till the operation to read out the signal level is carried out. In the global exposure operation, the pixel signal is read out from unit pixels 90 sequentially on a one-row-after-another basis. Thus, on a pixel row from which the pixel signal is read out at a later time, electric charge is held in the floating diffusion area 123 for a long period of time in comparison with a pixel row from which the pixel signal is read out at an earlier time. For example, on a pixel row from which the pixel signal is read out last, electric charge is held in the floating diffusion area 123 for a time period longer by a difference corresponding to about one frame than the holding period for a pixel row from which the pixel signal is read out first.

As a countermeasure against a long holding period of the floating diffusion area 123, the control pulse ABG is supplied to the overflow gate 161 ongoingly since a transfer of electric charge from the photodiode 121 to the floating diffusion area 123 till the operation to read out the signal and reset levels is completed. In this way, it is possible to prevent electric charge accumulated in the photodiode 121 from leaking out to the floating diffusion area 123 in the so-called blooming phenomenon.

It is to be noted that, in the following description, the operation to supply the control pulse ABG to the overflow gate 161 is referred to as an operation to activate or turn on the control pulse ABG or an operation to set the control pulse ABG at a high level. On the other hand, an operation to remove the control pulse ABG used as a control pulse ABG from the overflow gate 161 is referred to as an operation to deactivate or turn off the control pulse ABG or an operation to set the control pulse ABG at a low level.

As described above, by making use of the overflow gate 161, the blooming phenomenon can be avoided. If a parasitic capacitor exists between the floating diffusion area 123 and the overflow gate 161, however, only the signal level contains coupling noises when the control pulse ABG is sustained at the high level ongoingly.

That is to say, for the same reason as the coupling noise of the select pulse SEL, in the operation to read out the signal level, the floating diffusion area 123 is affected by the coupling effect when the control pulse ABG is changed from the turned-off (deactivated) state to the turned-on (activated) state. In the operation to read out the reset level, on the other hand, the floating diffusion area 123 is not affected by the coupling effect because the control pulse ABG is sustained in the turned-on state as it is. Thus, only the signal level contains coupling noises.

By providing a light shielding wire between the floating diffusion area 123 and the overflow gate 161, it is possible to reduce the quantity of the coupling noise generated by the parasitic capacitor existing between the floating diffusion area 123 and the overflow gate 161. If a light shielding wire is provided between the floating diffusion area 123 and the overflow gate 161, however, the size of an area occupied by each unit pixel 90 increases. With a larger area occupied by each unit pixel 90, it is inevitably impossible to realize a small size of the solid-state imaging device even though the small size should be normally a merit offered by the solid-state imaging device adopting the method of holding electric charge in the floating diffusion area 123. In addition, as progress is made in the fields of miniaturization and pixel downsizing, the distance between wires becomes short so that the effect of the coupling phenomenon caused by a parasitic capacitor existing between signal wires or between components increases.

In addition, since the coupling noise is dependent on power-supply fluctuations and the layout of unit pixels, on the image, the coupling noise looks like a pattern noise. In addition, since the coupling noise is a noise generated also at a dark time, the coupling noise raises a problem in the area of dark-time shading. On top of that, since the coupling noise is affected by the effect of power-supply fluctuations, two-dimensional shading is required in many cases. In such cases, it is difficult to eliminate the coupling noise by adoption of the so-called OPB (Optical Black) technique.

In order to solve the problems described above, the CMOS image sensor 50 controls the state of the control pulse ABG supplied to the overflow gate 161 as a pixel driving signal explained earlier by referring to FIG. 4. By controlling the state of the control pulse ABG, the quantity of the coupling noise contained in the pixel signal can be reduced.

Figure 11:
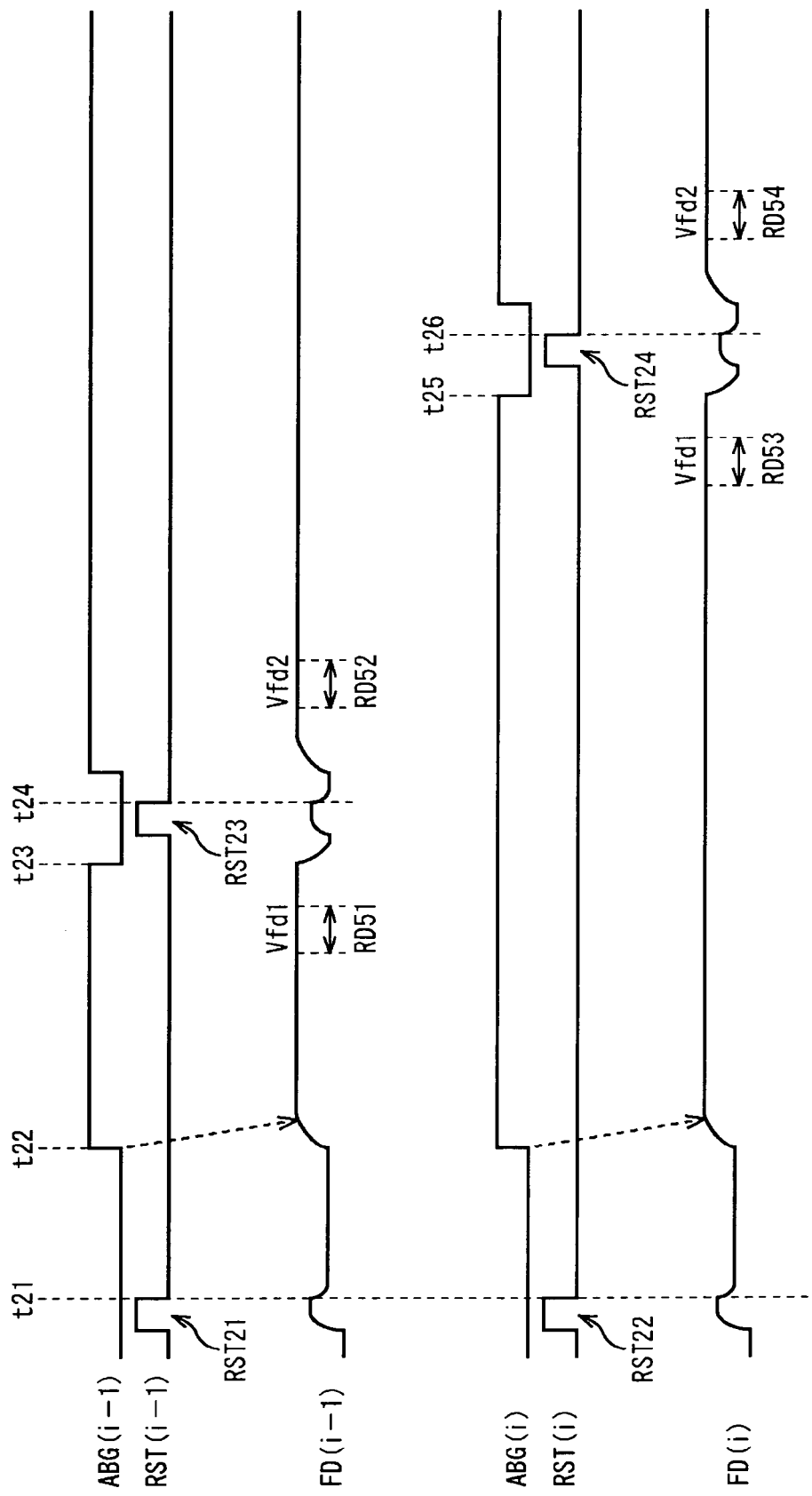
FIG. 11 is an explanatory timing diagram to be referred to in description of operations carried out by the solid-state imaging device according to the second embodiment of the present invention.

To put it more concretely, for example, the vertical drive section 62 controls the operation of the overflow gate 161 of each unit pixel 90 as shown in FIG. 11.

It is to be noted that, in FIG. 11, the horizontal axis represents the lapse of time. Reference symbols ABG(i-1), RST(i-1) and FD(i-1) denote respectively the voltage of the control pulse ABG supplied to the overflow gate 161, the voltage of the reset pulse RST supplied to the reset transistor 124 and the voltage FD appearing at the floating diffusion area 123 in unit pixels 90 provided on the (i-1)th pixel row of the pixel array section 61. By the same token, reference symbols ABG(i), RST(i) and FD(i) denote respectively the voltage of the control pulse ABG supplied to the overflow gate 161, the voltage of the reset pulse RST supplied to the reset transistor 124 and the voltage FD appearing at the floating diffusion area 123 in unit pixels 90 provided on the ith pixel row of the pixel array section 61. In addition, in order to make explanation with reference to FIG. 11 easy to understand, signal electric charge is assumed to be a dark-time signal.

In the CMOS image sensor 50, after the electronic shutter operation has been carried out for all unit pixels 90 at the same time, the floating diffusion area 123 is reset for all unit pixels 90 at the same time. That is to say, a reset pulse RST21 resets the floating diffusion area 123 employed in each of unit pixels 90 provided on the (i-1)th pixel row whereas a reset pulse RST22 resets the floating diffusion area 123 employed in each of unit pixels 90 provided on the ith pixel row.

At that time, the control pulse ABG supplied to the overflow gate 161 employed in each unit pixel 90 is sustained in a turned-off state. For example, at a time t21 coinciding with the falling edges of the reset pulses RST21 and RST22, the control pulse ABG has been put in the turned-off state.

Afterwards, at the end of the exposure period, electric charge is transferred from the photodiode 121 to the floating diffusion area 123 for all unit pixels 90 at the same time. Then, a time t22 coinciding with the end of the transfer of electric charge from the photodiode 121 to the floating diffusion area 123, the control pulse ABG is turned on or activated for all unit pixels 90 at the same time in order to prevent electric charge from leaking from the photodiode 121 to the floating diffusion area 123. Thus, in each of unit pixels 90 provided on the (i-1)th and ith pixel rows, a coupling phenomenon occurs between the overflow gate 161 and the floating diffusion area 123 so that the voltage FD(i-1) of the floating diffusion area 123 employed in each of unit pixels 90 provided on the (i-1)th pixel row and the voltage FD(i) of the floating diffusion area 123 employed in each of unit pixels 90 provided on the ith pixel row rise to a level Vfd1.

Afterwards, operations to read out pixel signals which are signal and reset levels are started sequentially on a one-row-after-another basis. When the read operation is started for a pixel row, the control pulse ABG for the pixel row is sustained in the turned-on (activated) state as it is. In the typical example shown in FIG. 11, first of all, pixel signals are read out from unit pixels 90 provided on the (i-1)th pixel row. Then, pixel signals are read out from unit pixels 90 provided on the ith pixel row.

That is to say, in a period RD51, the column processing section 63 reads out the signal level from the floating diffusion area 123 for unit pixels 90 provided on the (i-1)th pixel row. Then, at a time t23, the control pulse ABG is turned off for unit pixels 90 provided on the (i-1)th pixel row. Thus, the voltage FD(i-1) of the floating diffusion area 123 falls down.

Afterward, the reset pulse RST is turned on in order to reset the floating diffusion area 123 for unit pixels 90 provided on the (i-1)th pixel row. That is to say, a reset pulse RST23 is supplied to the reset transistor 124 in order to reset the floating diffusion area 123 for unit pixels 90 provided on the (i-1)th pixel row. Thus, the voltage FD(i-1) of the floating diffusion area 123 rises. At a time t24 coinciding with the falling edge of the reset pulse RST23, the control pulse ABG for the (i-1)th pixel row is sustained in the turned-off state as it is. At the time t24, the voltage FD(i-1) of the floating diffusion area 123 falls down.

Afterward, the control pulse ABG for the (i-1)th pixel row is turned on or activated. Thus, in each of unit pixels 90 provided on the (i-1)th pixel row, a coupling phenomenon occurs between the overflow gate 161 and the floating diffusion area 123 so that the voltage FD(i-1) of the floating diffusion area 123 employed in each of unit pixels 90 provided on the (i-1)th pixel row rises to a level Vfd2. Then, in a period RD52, the column processing section 63 reads out the reset level from the floating diffusion area 123 for unit pixels 90 provided on the (i-1)th pixel row. In the period RD52, the control pulse ABG for the (i-1)th pixel row is sustained in the turned-on state as it is. After the period RD52, the control pulse ABG for the (i-1)th pixel row is also ongoingly sustained in the turned-on state.

In this way, at the times t21 and t24, in each unit pixel 90 provided on the (i-1)th pixel row, the control pulse ABG is sustained in the turned-off state. Then, the control pulse ABG is turned on prior to the period RD51 in which the signal level is read out after the time t21 and prior to the period RD52 in which the reset level is read out after the time t24. Thus, a voltage difference by which the voltage FD(i-1) increases due to the coupling phenomenon occurring prior to the operation to read out the signal level is equal to a voltage difference by which the voltage FD(i-1) increases due to the coupling phenomenon occurring prior to the operation to read out the reset level. As a result, the level Vfd1 to which the voltage FD(i-1) increases due to the coupling phenomenon occurring prior to the operation to read out the signal level is equal to the level Vfd2 to which the voltage FD(i-1) increases due to the coupling phenomenon occurring prior to the operation to read out the reset level, that is, Vfd1=Vfd2. Accordingly, the quantity of the coupling noise contained in the signal level is equal to the quantity of the coupling noise contained in the reset level. As a result, the coupling noise contained in the reset level cancels the coupling noise contained in the signal level.

Right after the pixel signals have been read out from unit pixels 90 provided on the (i-1)th pixel row, pixel signals are read out from unit pixels 90 provided on the ith pixel row. In each of the unit pixels 90 provided on the ith pixel row, after the control pulse ABG has been turned on at the time t22, the control pulse ABG is ongoingly sustained in the turned-on state as it is till the operation to read out a pixel signal is started.

First of all, in a period RD53, with the control pulse ABG for the ith pixel row sustained in the turned-on state as it is, the column processing section 63 reads out the signal level from the floating diffusion area 123 for unit pixels 90 provided on the ith pixel row. Then, at a time t25, the control pulse ABG is turned off for unit pixels 90 provided on the ith pixel row. Thus, the voltage FD(i) of the floating diffusion area 123 falls down.

Afterward, the reset pulse RST is turned on in order to reset the floating diffusion area 123 for unit pixels 90 provided on the ith pixel row. That is to say, a reset pulse RST24 is supplied to the reset transistor 124 in order to reset the floating diffusion area 123 for unit pixels 90 provided on the ith pixel row. Thus, the voltage FD(i) of the floating diffusion area 123 rises. At a time t26 coinciding with the falling edge of the reset pulse RST24, the control pulse ABG for the ith pixel row is sustained in the turned-off state as it is. At the time t26, the voltage FD(i) of the floating diffusion area 123 falls down.

Afterward, the control pulse ABG for the ith pixel row is turned on or activated. Thus, in each of unit pixels 90 provided on the ith pixel row, a coupling phenomenon occurs between the overflow gate 161 and the floating diffusion area 123 so that the voltage FD(i) of the floating diffusion area 123 employed in each of unit pixels 90 provided on the ith pixel row rises to a level Vfd2. Then, in a period RD54, the column processing section 63 reads out the reset level from the floating diffusion area 123 for unit pixels 90 provided on the ith pixel row. In the period RD54, the control pulse ABG for the ith pixel row is sustained in the turned-on state as it is. After the period RD54, the control pulse ABG for the ith pixel row is also ongoingly sustained in the turned-on state.

As described above, in the CMOS image sensor 50, the state of the control pulse ABG at the time at which the floating diffusion area 123 is reset immediately prior to the operation to read out the reset level is controlled to the same state as the state of the control pulse ABG at the time at which the floating diffusion area 123 is reset immediately prior to the operation to read out the signal level. In addition, the state of the control pulse ABG in the period allocated to the operation to read out the reset level is controlled to the same state as the state of the control pulse ABG in the period allocated to the operation to read out the signal level.

Accordingly, the quantity of the coupling noise contained in the signal level can be made approximately equal to the quantity of the coupling noise contained in the reset level. As a result, the effect of the coupling noise on the pixel signal can be reduced.

Third Embodiment

Operation of the Overflow Gate

It is to be noted that, in the case of the typical example shown in FIG. 11, prior to the operations to read out the signal and reset levels, the control pulse ABG is sustained in a turned-on state. However, prior to the operations to read out the signal and reset levels, the control pulse ABG can also be sustained in a turned-off state.

Figure 12:
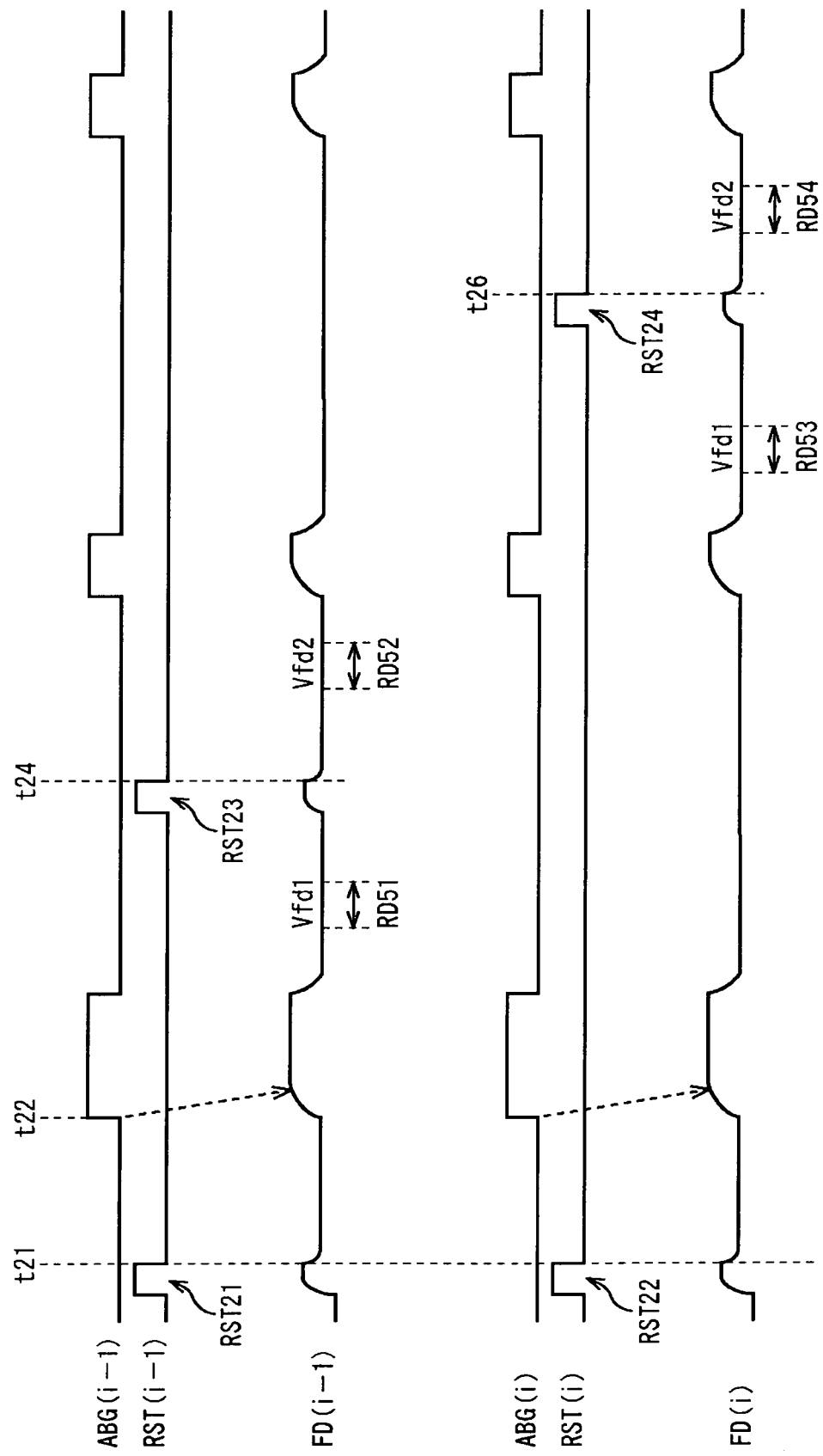
FIG. 12 is an explanatory timing diagram to be referred to in description of operations carried out by the solid-state imaging device according to a third embodiment of the present invention.

In such a case, the vertical drive section 62 controls operation timings of unit pixels 90 on every pixel row as shown in FIG. 12.

It is to be noted that, in FIG. 12, the horizontal axis represents the lapse of time. In FIG. 12, portions identical with their respective counterparts shown in FIG. 11 are denoted by the same reference symbols as the counterparts and the explanation of the identical portions is omitted if such explanation is not required. In addition, in order to make explanation with reference to FIG. 12 easy to understand, signal electric charge is assumed to be a dark-time signal.

In the typical example shown in FIG. 12, after the electric shutter operation has been carried out for all unit pixels 90 at the same time, the floating diffusion area 123 employed in the unit pixel 90 is reset also for all unit pixels 90 at the same time by activating the reset pulse RST. After the activation of the reset pulse RST or, in particular, at a time t21 coinciding with the falling edge of the reset pulse RST, the control pulse ABG supplied to the overflow gate 161 is sustained in a turned-off state for all pixel rows.

Then, at a time t22 after electric charge has been transferred to the floating diffusion area 123, the control pulse ABG supplied to the overflow gate 161 is turned on for all pixel rows. When the control pulse ABG supplied to the overflow gate 161 is turned on, the floating diffusion area 123 is affected by an effect of coupling with the overflow gate 161 for every pixel row. Thus, the voltage FD(i-1) appearing at the floating diffusion area 123 employed in every unit pixel 90 on the (i-1)th pixel row and the voltage FD(i) appearing at the floating diffusion area 123 employed in every unit pixel 90 on the ith pixel row rise.

Then, when an operation to read out pixel signals on a one-row-after-another-one basis is started, the control pulse ABG applied to the overflow gate 161 is turned off for all pixel rows at the same time. Thus, the voltage FD(i-1) appearing at the floating diffusion area 123 employed in every unit pixel 90 on the (i-1)th pixel row and the voltage FD(i) appearing at the floating diffusion area 123 employed in every unit pixel 90 on the ith pixel row fall down to a level Vfd1.

Afterward, in a period RD51, the column processing section 63 reads out the signal level from the floating diffusion area 123 for unit pixels 90 provided on the (i-1)th pixel row. Then, a reset pulse RST23 is supplied to the reset transistor 124 in order to reset the floating diffusion area 123 for unit pixels 90 provided on the (i-1)th pixel row. When the reset pulse RST23 is supplied to the reset transistor 124, the voltage FD(i-1) appearing at the floating diffusion area 123 employed in every unit pixel 90 on the (i-1)th pixel row once rises. At a time t24 coinciding with the falling edge of the reset pulse RST23, however, the voltage FD(i-1) appearing at the floating diffusion area 123 employed in every unit pixel 90 on the (i-1)th pixel row falls down to a level Vfd2.

Subsequently, in a period RD52, the column processing section 63 reads out the reset level from the floating diffusion area 123 for unit pixels 90 provided on the (i-1)th pixel row. It is to be noted that the control pulse ABG for the (i-1)th pixel row is continuously sustained in the turned-off state as it is since a time immediately prior to the operation to read out the signal level till a time following the end of the operation to read out the reset level.

As is obvious from the above description, in every unit pixel 90 provided on the (i-1)th pixel row, at the times t21 and t24, the control pulse ABG has been put in the turned-off state. In addition, also in the period RD51 allocated to the operation to read out the signal level and the period RD51 allocated to the operation to read out the reset level, the control pulse ABG is sustained in the turned-off state. It is thus possible to reduce the magnitude of the coupling effect of the overflow gate 161 on the floating diffusion area 123. As a result, the quantity of the coupling noise contained in the pixel signal can be decreased.

After the operations to read out pixel signals from unit pixels 90 provided on the (i-1)th pixel row have been completed, operations to read out pixel signals from unit pixels 90 provided on the ith pixel row are carried out as follows.

The control pulse ABG is turned on for all pixel rows at the same time and, after the control pulse ABG has been turned on, the control pulse ABG is turned off also for all pixel rows at the same time. When the control pulse ABG is turned on, the voltage FD(i-1) appearing at the floating diffusion area 123 employed in every unit pixel 90 on the (i-1)th pixel row and the voltage FD(i) appearing at the floating diffusion area 123 employed in every unit pixel 90 on the ith pixel row once rise. As the control pulse ABG is turned off, on the other hand, the voltage FD(i-1) appearing at the floating diffusion area 123 employed in every unit pixel 90 on the (i-1)th pixel row falls down. In particular, the voltage FD(i) appearing at the floating diffusion area 123 employed in every unit pixel 90 on the ith pixel row falls down to the level Vfd1.

Afterward, in a period RD53, the column processing section 63 reads out the signal level from the floating diffusion area 123 for unit pixels 90 provided on the ith pixel row. Then, a reset pulse RST24 is supplied to the reset transistor 124 in order to reset the floating diffusion area 123 for unit pixels 90 provided on the ith pixel row. Subsequently, in a period RD54, the column processing section 63 reads out the reset level from the floating diffusion area 123 for unit pixels 90 provided on the ith pixel row.

As described above, in the CMOS image sensor 50, the state of the control pulse ABG at the time at which the floating diffusion area 123 is reset immediately prior to the operation to read out the reset level is controlled to the same turned-off state as the state of the control pulse ABG at the time at which the floating diffusion area 123 is reset immediately prior to the operation to read out the signal level. In addition, the state of the control pulse ABG in the period allocated to the operation to read out the reset level is controlled to the same turned-off state as the state of the control pulse ABG in the period allocated to the operation to read out the signal level.

Accordingly, the quantity of the coupling noise contained in the signal level can be made approximately equal to the quantity of the coupling noise contained in the reset level. As a result, the effect of the coupling noise on the pixel signal can be reduced.

In the case of the third embodiment shown in FIG. 12, the level of the voltage appearing at the floating diffusion area 123 can be made low in comparison with the second embodiment shown in FIG. 11. Thus, the third embodiment offers a merit that the magnitude of the dark-time current can be reduced. In the case of the third embodiment shown in FIG. 12, however, the turned-on period set for the control pulse ABG as a period for discarding electric charge from the photodiode 121 is short in comparison with the second embodiment shown in FIG. 11. Thus, the second embodiment with the control thereof carried out as shown in FIG. 11 has better resistance to the blooming phenomenon.

Fourth Embodiment

Configuration of the Vertical Drive Section

By the way, in signal pre-read CDS (Correlated Double Sampling) processing carried out by a solid-state imaging device provided with a global exposure function making use of a floating diffusion area, a signal level is read out first before a reset level is read out. That is to say, in the signal pre-read CDS processing, the signal level is pre-read.

In such a solid-state imaging device, the operation to reset the floating diffusion area in an exposure period is carried out for all pixel rows at the same time whereas the operation to reset the floating diffusion area before reading out a reset level is carried out on a one-row-after-another basis. In the following description, the operation to reset the floating diffusion area in an exposure period is referred to as an exposure reset operation whereas the operation to reset the floating diffusion area before reading out a reset level is referred to as a read reset operation.

Since the exposure reset operation is carried out for all pixel rows at the same time, power-supply fluctuations generated in the exposure reset operation are large whereas power-supply fluctuations generated in the read reset operation are small. Thus, if the effect of the power-supply fluctuations is taken into consideration, a coupling effect experienced by the floating diffusion area during the exposure reset operation is different from a coupling effect experienced by the floating diffusion area during the read reset operation.

Therefore, in order to solve the problem described above, in addition to the necessity to control pixel driving signals so as to reduce the quantity of the coupling noise contained in a pixel signal, it is also necessary to make efforts in the design of the vertical drive section 62 to decrease the power-supply fluctuations. By reducing the quantity of the coupling noise and decreasing the power-supply fluctuations, the effect of the coupling noise on the pixel signal can be further made smaller.

Figure 13:
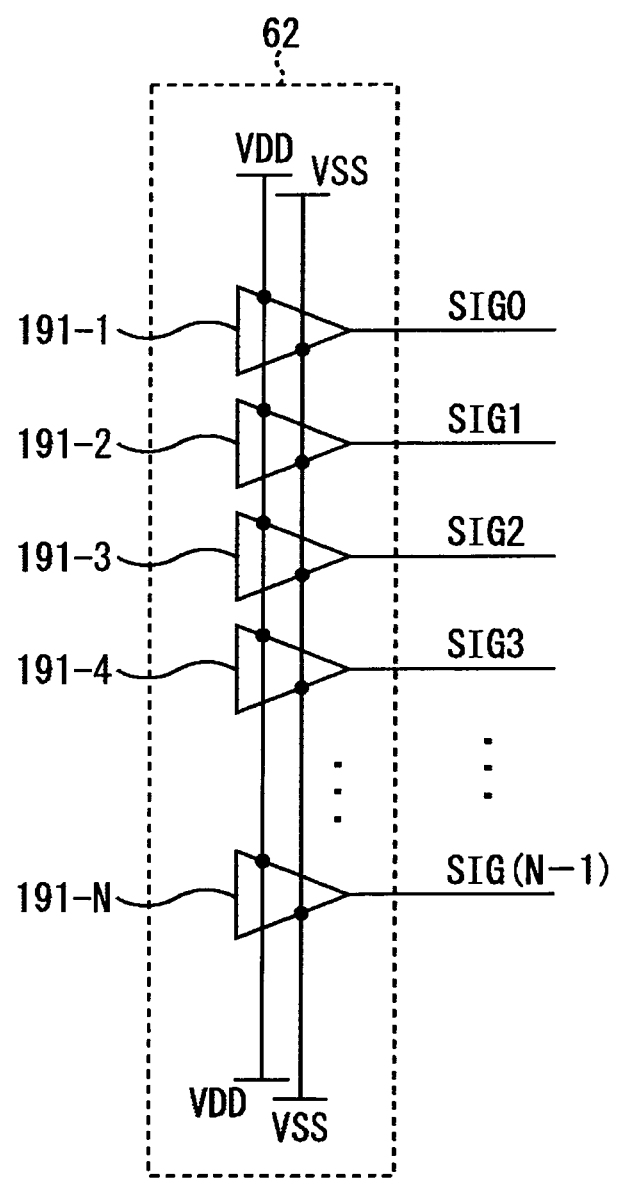
FIG. 13 is a circuit diagram showing a typical configuration of a vertical drive section.

As a typical configuration of a vertical drive section 62 capable of reducing power-supply fluctuations, a configuration shown in FIG. 13 is conceivable. That is to say, FIG. 13 is a circuit diagram showing a typical configuration of such a vertical drive section 62.

The vertical drive section 62 shown in FIG. 13 is configured to include drivers 191-1 to 191-N connected to each other to form a parallel circuit. It is to be noted that, in the following description, if it is not necessary to individually distinguish the drivers 191-1 to 191-N from each other, each of the drivers 191-1 to 191-N is referred to simply as a driver 191.

The driver 191 is connected to power supplies VDD and VSS. The driver 191 supplies a pixel driving signal SIGn, where suffix n is an integer satisfying relations $0 \leq n \leq (N-1)$, to unit pixels 90 provided on a pixel row associated with the driver 191. The level of a voltage generated by the power supply VDD is used as the high level of the pixel driving signal SIGn whereas the level of a voltage generated by the power supply VDD is used as the low level of the pixel driving signal SIGn. The low level of the pixel driving signal SIGn is lower than the high level of the pixel driving signal SIGn. The pixel driving signal SIGn can be the select signal SEL, the reset signal RST, the control signal ABG or the like. That is to say, in actuality, each driver 191 employed in the vertical drive section 62 shown in FIG. 13 is provided for generating every pixel driving signal such as the select signal SEL, the reset signal RST, the control signal ABG or the like for a pixel row associated with the driver 191.

Configuration of the Driver

Figure 14:
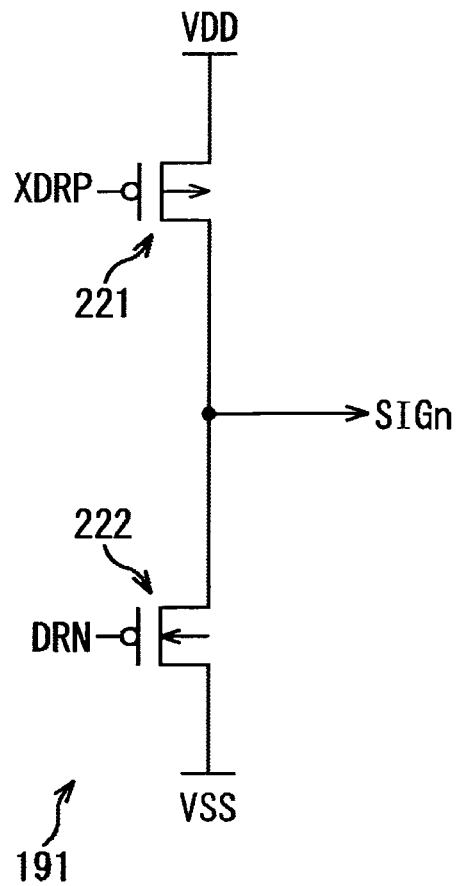
FIG. 14 is a circuit diagram showing a typical configuration of a driver.

Such a driver 191 is configured to include typically a P-type transistor 221 and an N-type transistor 222 as shown in FIG. 14.

The source electrodes of the P-type transistor 221 and the N-type transistor 222 are connected to the power supplies VDD and VSS respectively. The drain electrodes of the P-type transistor 221 and the N-type transistor 222 are connected to each other. A voltage appearing at the drain electrodes is supplied to a unit pixel 90 as the pixel driving signal SIGn. If the pixel driving signal SIGn is the select pulse SEL for example, the driver 191 supplies the pixel driving signal SIGn to the gate electrode of the select transistor 126 employed in the unit pixel 90.

To put it more concretely, when a drive signal XDRP supplied to the gate electrode of the P-type transistor 221 is activated, that is, when the drive signal XDRP is set at a low level, the pixel driving signal SIGn is raised to the high level which is the level of a voltage generated by the power supply VDD. When a drive signal DRN supplied to the gate electrode of the N-type transistor 222 is activated, that is, when the drive signal DRN is set at a high level, on the other hand, the pixel driving signal SIGn is set at the low level which is the level of a voltage generated by the power supply VSS.

Operation of the Driver

In the driver 191 having such a configuration, the drive signal XDRP is a signal for putting the pixel driving signal SIGn in the turned-on or high-level state whereas the drive signal DRN is a signal for putting the pixel driving signal SIGn in the turned-off or low-level state. If the drive signal XDRP and the drive signal DRN are activated at the same time, however, the magnitude of the power-supply fluctuations caused by a penetration current flowing from the power supply VDD to the power supply VSS increases.

Figure 15:
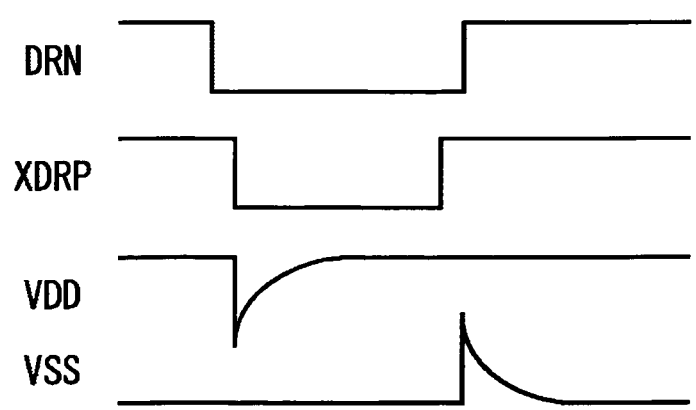
FIG. 15 is an explanatory timing diagram to be referred to in description of operations carried out by the driver shown in FIG. 14.

In order to solve the problem described above, the vertical drive section 62 drives the driver 191 by changing the driving signals XDRP and DRN as shown in FIG. 15 so as to prevent the penetration current from flowing. It is to be noted that, in FIG. 15, the horizontal axis represents the lapse of time. Reference symbols DRN, XDRP, VDD and VSS denote the voltage of the drive signal DRN, the voltage of the drive signal XDRP, the voltage generated by the power supply VDD and the voltage generated by the power supply VSS respectively.

In FIG. 15, the high-level segment of the waveform of the drive signal DRN represents the activated state of the drive signal DRN. In the activated state of the drive signal DRN, the pixel driving signal SIGn is set at the low level which is the level of a voltage generated by the power supply VSS. On the other hand, the low-level segment of the waveform of the drive signal DRN represents the deactivated state of the drive signal DRN.

The low-level segment of the waveform of the drive signal XDRP represents the activated state of the drive signal XDRP. In the activated state of the drive signal XDRP, the pixel driving signal SIGn is set at the high level which is the level of a voltage generated by the power supply VDD. On the other hand, the high-level segment of the waveform of the drive signal XDRP represents the deactivated state of the drive signal XDRP.

In the turned-off state of the pixel driving signal SIGn, the pixel driving signal SIGn is set at the level of a voltage generated by the power supply VSS. In the turned-on state of the pixel driving signal SIGn, on the other hand, the pixel driving signal SIGn is set at the level of a voltage generated by the power supply VDD. The vertical drive section 62 changes the pixel driving signal SIGn from the turned-off state to the turned-on state and, reversely, changes the pixel driving signal SIGn from the turned-on state back to the turned-off state as follows.

The pixel driving signal SIGn is sustained in the turned-off state when both the driving signals DRN and XDRP are sustained at the high level. In order to change the pixel driving signal SIGn from the turned-off state to the turned-on state, the vertical drive section 62 first changes the drive signal DRN from the high level to the low level and, then, changes the drive signal XDRP from the high level to the low level. When the vertical drive section 62 changes the drive signal XDRP from the high level to the low level, the voltage generated by the power supply VDD instantaneously drops to a low level.

The pixel driving signal SIGn is sustained in the turned-on state when both the driving signals DRN and XDRP are sustained at the low level. In order to change the pixel driving signal SIGn from the turned-on state back to the turned-off state, the vertical drive section 62 first changes the drive signal XDRP from the low level back to the high level and, then, changes the drive signal DRN from the low level back to the high level. When the vertical drive section 62 changes the drive signal DRN from the low level back to the high level, the voltage generated by the power supply VSS instantaneously rises to a high level.

As described above, the vertical drive section 62 shifts the falling timings of the driving signals DRN and XDRP from each other and also shifts the rising timings of the driving signals DRN and XDRP from each other in order to prevent currents from flowing to both the P-type transistor 221 and the N-type transistor 222 at the same time. In this way, the penetration current can be avoided. It is thus possible to suppress power-supply fluctuations which are generated when a pixel driving signal supplied to the unit pixel 90 for all pixel rows at the same time is activated or deactivated.

Fifth Embodiment

Configuration of the Driver

Figure 16:
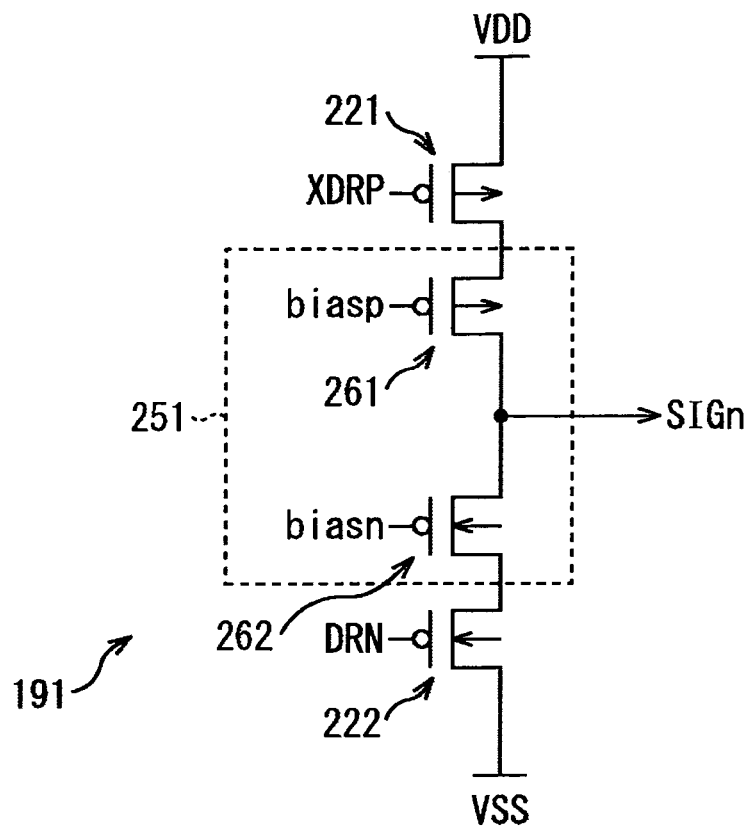
FIG. 16 is a circuit diagram showing another typical configuration of the driver.

It is to be noted that the driver 191 shown in FIG. 14 can be provided with a current limiter in order to further suppress power-supply fluctuations. The driver 191 configured to include a current limiter 251 is shown in FIG. 16. In addition to the components employed in the driver 191 shown in FIG. 14, the driver 191 shown in FIG. 16 also has the current limiter 251 provided between the P-type transistor 221 and the N-type transistor 222.

The current limiter 251 is configured to include a P-type transistor 261 and an N-type transistor 262. The drain electrodes of the P-type transistor 261 and the N-type transistor 262 are connected to each other. A voltage appearing at the drain electrodes is supplied to a unit pixel 90 as the pixel driving signal SIGn.

In addition, the source electrode of the P-type transistor 261 is connected to the drain electrode of the P-type transistor 221 whereas the source electrode of the N-type transistor 262 is connected to the drain electrode of the N-type transistor 222. A drive signal biasp applied to the gate electrode of the P-type transistor 261 is a bias for limiting a current flowing through the P-type transistor 261 to a constant magnitude. By the same token, a drive signal biasn applied to the gate electrode of the N-type transistor 262 is a bias for limiting a current flowing through the N-type transistor 262 to a constant magnitude.

Operation of the Driver

Figure 17:
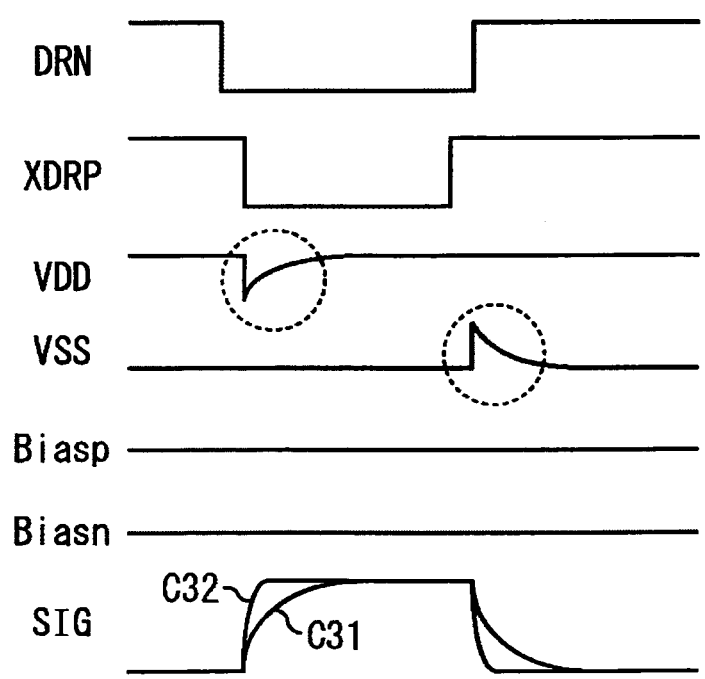
FIG. 17 is an explanatory timing diagram to be referred to in description of operations carried out by the driver shown in FIG. 16.

The vertical drive section 62 drives the driver 191, which has the configuration shown in FIG. 16, as shown in FIG. 17. It is to be noted that, in FIG. 17, the horizontal axis represents the lapse of time. Reference symbols DRN, XDRP, VDD and VSS denote the voltage of the drive signal DRN, the voltage of the drive signal XDRP, the voltage generated by the power supply VDD and the voltage generated by the power supply VSS respectively. In addition, reference symbols Biasp, Biasn and SIG denote the voltages of the drive signal biasp, the drive signal biasn and the pixel driving signal SIGn respectively.

In the typical example shown in FIG. 17 for the fifth embodiment, the vertical drive section 62 drives the P-type transistor 221 and the N-type transistor 222 with the same timings as the typical example shown in FIG. 15 for the fourth embodiment. Thus, the pixel driving signal SIGn denoted by reference symbol SIG is changed from a turned-off state represented by the low level to a turned-on state represented by the high level and changed again from the turned-on state back to the turned-off state.

A curve C31 is the waveform of the pixel driving signal SIGn output by the driver 191 provided in the vicinity of the center of the vertical drive section 62 shown in FIG. 13. On the other hand, a curve C32 is the waveform of the pixel driving signal SIGn output by the driver 191 provided in the vicinity of an edge of the vertical drive section 62 shown in FIG. 13.

To be more specific, for example, the curve C31 is the waveform of the pixel driving signal SIGn output by the driver 191-4 whereas the curve C32 is the waveform of the pixel driving signal SIGn output by the driver 191-1. The rising and falling edges of the waveform C32 of the pixel driving signal SIGn output by the driver 191 provided in the vicinity of the power supplies VDD and VSS are abrupt whereas the rising and falling edges of the waveform C31 of the pixel driving signal SIGn output by the driver 191 provided in the vicinity of the center of the vertical drive section 62 is lenient in comparison with the waveform C32. This is because, as will be described later, the closer the position of the driver 191 to the center of the vertical drive section 62, the larger the barrier that a current has to overcome in order to flow through the P-type transistor 261 and the N-type transistor 262 which are employed in the driver 191.

In the current limiter 251, the drive signal biasp having a constant voltage is supplied continuously to the gate electrode of the P-type transistor 261 whereas the drive signal biasn having a constant voltage is supplied continuously to the gate electrode of the N-type transistor 262. Thus, the magnitude of a penetration current which flows during an operation to drive the driver 191 are suppressed. As a result, in the typical example shown in FIG. 17 for the fifth embodiment, the fluctuations of the voltages generated by the power supplies VDD and VSS are small in comparison with those for the typical example shown in FIG. 15 in the case of the fourth embodiment.

Sixth Embodiment

Configuration of the Driver

By the way, in the driver 191 according to the fifth embodiment shown in FIG. 16, the current limiter 251 is provided in order to reduce power-supply fluctuations. Since each of the drive signal biasp and the drive signal biasn has a constant voltage, however, the configuration of the current limiter 251 is not a configuration capable of coping with AC (alternating current) fluctuations of the power supplies VDD and VSS.

That is to say, in the case of a driver 191 provided at a position far away from the power supplies VDD and VSS, the power-supply fluctuations generated in the driver 191 are prominent. For example, the driver 191 provided in the vicinity of the center of the vertical drive section 62 shown in FIG. 13 generates remarkable power-supply fluctuations. Since each of the drive signal biasp and the drive signal biasn has a constant voltage in spite of the large power-supply fluctuations generated in the driver 191 provided in the vicinity of the center of the vertical drive section 62 as fluctuations of the power supplies VDD and VSS, however, a voltage Vgs between the gate and source electrodes of each of the P-type transistor 261 and the N-type transistor 262 decreases. As a result, the closer the position of the driver 191 to the center of the vertical drive section 62, the larger the barrier that a current has to overcome in order to flow through the P-type transistor 261 and the N-type transistor 262 which are employed in the driver 191.

Thus, as shown in FIG. 17, the level-transition times (that is, the gradients) of the rising and falling edges of the curve C32 representing the pixel driving signal SIGn output by a driver 191 provided at a position close to the power supplies VDD and VSS are different from the level-transition times of the rising and falling edges of the curve C31 representing the pixel driving signal SIGn output by a driver 191 provided at a position far away from the power supplies VDD and VSS. These differences in rising and falling edge level-transition times appear as non-uniformity of coupling effects generated in unit pixels 90. It is thus desirable to make the level transition times uniform.

Figure 18:
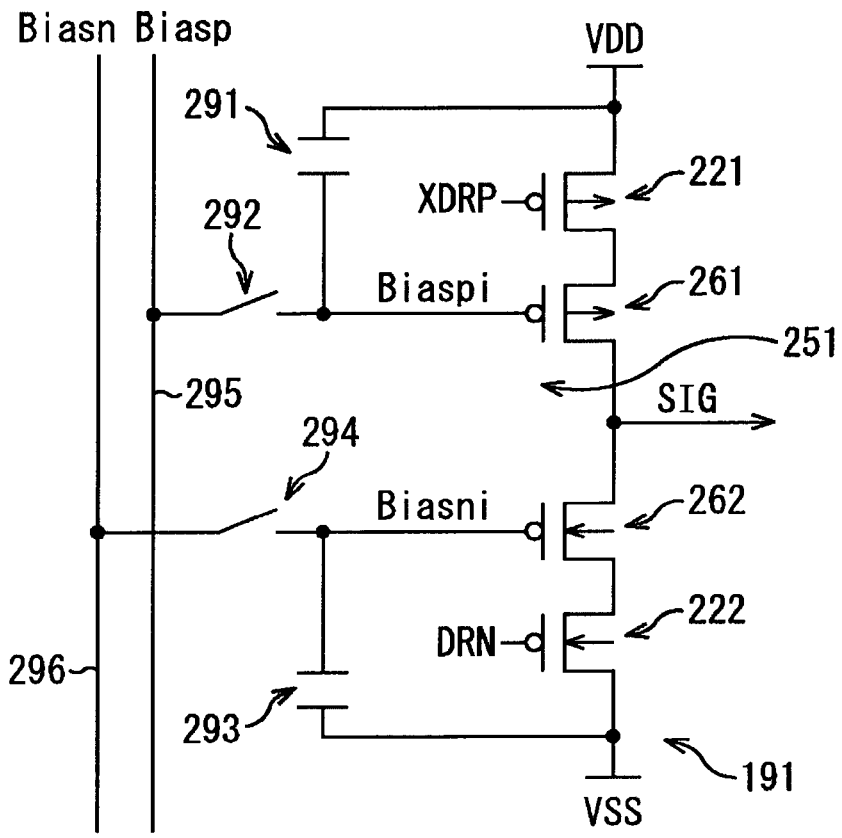
FIG. 18 is a circuit diagram showing a further typical configuration of a driver.

For the reason described above, the driver 191 is designed into a configuration shown in FIG. 18. With this configuration, the level-transition times of the rising and falling edges of the pixel driving signal SIGn generated by the driver 191 can be made all but uniform for all the drivers 191. It is to be noted that, in FIG. 18, portions identical with their respective counterparts shown in FIG. 16 in the case of the fifth embodiment are denoted by the same reference symbols as the counterparts and the explanation of the identical portions is omitted if such explanation is not required.

In addition to the components included in the driver 191 shown in FIG. 16, the driver 191 shown in FIG. 18 also employs capacitors 291 and 293 as well as switches 292 and 294.

As shown in FIG. 18, a power supply Biasp is connected to the gate electrode of the P-type transistor 261 through the switch 292 and a signal line 295 used as a bias line. The power supply Biasp provides the gate electrode of the P-type transistor 261 with a drive signal Biaspi having a magnitude causing a constant current to flow through the P-type transistor 261. In addition, the gate electrode of the P-type transistor 261 is connected to the power supply VDD by the capacitor 291.

By the same token, a power supply Biasn is connected to the gate electrode of the N-type transistor 262 through the switch 294 and a signal line 296 used as a bias line. The power supply Biasn provides the gate electrode of the N-type transistor 262 with a drive signal Biasni having a magnitude causing a constant current to flow through the N-type transistor 262. In addition, the gate electrode of the N-type transistor 262 is connected to the power supply VSS by the capacitor 293.

It is to be noted that the capacitor 291 is provided not for stabilizing the power supply VDD. Instead, the capacitor 291 is inserted thereto for letting the drive signal Biaspi follow the fluctuations of the voltage generated by the power supply VDD. By the same token, the capacitor 293 is provided not for stabilizing the power supply VSS. Instead, the capacitor 293 is inserted thereto for letting the drive signal Biasni follow the fluctuations of the voltage generated by the power supply VSS.

In addition, in place of the switch 292, a resistor having a high resistance can be provided between the P-type transistor 261 and the signal line 295. By the same token, in place of the switch 294, a resistor having a high resistance can be provided between the N-type transistor 262 and the signal line 296.

Operation of the Driver

Next, the operation of the driver 191 shown in FIG. 18 is explained as follows.

In the driver 191, the switch 292 is turned on in advance in order to supply the voltage generated by the power supply Biasp to the gate electrode of the P-type transistor 261 as the drive signal Biaspi. By the same token, the switch 294 is turned on in advance in order to supply the voltage generated by the power supply Biasn to the gate electrode of the N-type transistor 262 as the drive signal Biasni.

Then, immediately prior to the global driving operation triggered by a pixel driving signal, the vertical drive section 62 turns off the switches 292 and 294 for all unit pixels 90 at the same time in order to put each of the drive signals Biaspi and Biasni in a holding state.

Afterward, as the global driving operation is started, the power supplies VDD and VSS generate voltage fluctuations causing the drive signals Biaspi and Biasni to vary by magnitudes according to the fluctuations. Thus, a voltage appearing between the gate and source electrodes of the P-type transistor 261 as well as a voltage appearing between the gate and source electrodes of the N-type transistor 262 can each be held at a constant magnitude with no regard to the distance between the driver 191 and the power supply VDD and the distance between the driver 191 and the power supply VSS respectively. As a result, the level transition time on the rising edge of the pixel driving signal SIGn generated by the driver 191 and the level-transition time on the falling edge of the pixel driving signal SIGn can be made uniform for all the drivers 191. Thus, the coupling effect generated in each of the unit pixels 90 due to variations of the pixel driving signal SIGn can be made uniform for all pixel rows.

Figure 19:
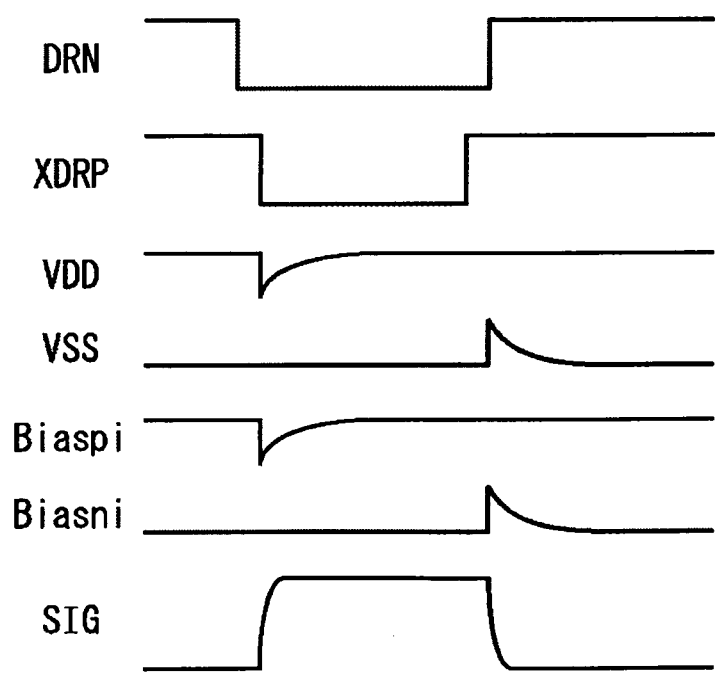
FIG. 19 is an explanatory timing diagram to be referred to in description of operations carried out by the driver shown in FIG. 18.

It is to be noted that the vertical drive section 62 drives the driver 191, which has the configuration shown in FIG. 18, as shown in FIG. 19. It is also worth noting that, in FIG. 19, the horizontal axis represents the lapse of time. Reference symbols DRN, XDRP, VDD and VSS denote the voltage of the drive signal DRN, the voltage of the drive signal XDRP, the voltage generated by the power supply VDD and the voltage generated by the power supply VSS respectively. In addition, reference symbols Biaspi, Biasni and SIG denote the voltages of the drive signal Biaspi, the drive signal Biasni and the pixel driving signal SIGn respectively.

In the typical example shown in FIG. 19 for the sixth embodiment, the vertical drive section 62 drives the P-type transistor 221 and the N-type transistor 222 with the same timings as the typical example shown in FIG. 17 in the case of the fifth embodiment. Thus, the pixel driving signal SIGn denoted by reference symbol SIG is changed from a turned-off state represented by the low level to a turned-on state represented by the high level and changed again from the turned-on state back to the turned-off state.

When the pixel driving signal SIGn is changed from the turned-off state to the turned-on state, the voltage generated by the power supply VDD fluctuates as shown by the waveform VDD of FIG. 19 in the same way the waveform VDD shown in FIG. 17. In the case of the driver 191 shown in FIG. 18, however, the capacitor 291 is provided so that the drive signal Biaspi changes by following the fluctuation of the voltage of the power supply VDD as shown by the waveform Biaspi of FIG. 19. As a result, a current having an all but constant magnitude is flowing through the P-type transistor 261 so that the pixel driving signal SIGn represented by the waveform SIG in FIG. 19 changes from the low level to the high level abruptly instead of leniently.

By the same token, when the pixel driving signal SIGn is changed from the turned-on state back to the turned-off state, the power supply VSS fluctuates as shown by the waveform VSS of FIG. 19 in the same way the waveform VSS shown in FIG. 17. In the case of the driver 191 shown in FIG. 18, however, the capacitor 293 is provided so that the drive signal Biasni changes by following the fluctuation of the voltage of the power supply VSS as shown by the waveform Biasni of FIG. 19. As a result, a current having an all but constant magnitude is flowing through the N-type transistor 262 so that the pixel driving signal SIGn represented by the waveform SIG in FIG. 19 changes from the high level to the low level abruptly instead of leniently.

As described above, by configuring the driver 191 as shown in FIG. 14 in the case of the fourth embodiment, FIG. 16 in the case of the fifth embodiment or FIG. 18 in the case of the sixth embodiment, it is possible to reduce the effect of the power-supply fluctuations generated in a global driving operation. Thus, it is possible to decrease the non-uniformity observed among pixel rows as the non-uniformity of the coupling noise generated in a global driving operation.

As described above, each of the drivers 191 shown in FIGS. 16 and 18 has the current limiter 251. However, the driver 191 can be so configured that the current limiter 251 operates only in a global driving operation with large power-supply fluctuations. With such a configuration of the driver 191, the current limiter 251 does not operate in an operation to read out pixel signals from unit pixels 90 on a one-row-after-another basis for which power-supply fluctuations are small. In this configuration, for example, in a global driving operation, voltages determined in advance are supplied to the gate electrodes of the P-type transistor 261 and the N-type transistor 262 respectively. In an operation carried out to read out pixel signals from unit pixels 90 on a one-row-after-another basis, on the other hand, a voltage close to the level of the voltage generated by the power supply VDD is supplied to the gate electrode of the P-type transistor 261 whereas a voltage close to the level of the voltage generated by the power supply VSS is supplied to the gate electrode of the N-type transistor 262 so that the current limiter 251 does not operate.

In addition, in the case of the sixth embodiment, the capacitor 291 is provided between the gate electrode of the P-type transistor 261 and the power supply VDD which is connected to the source electrode of the P-type transistor 221. However, in place of the capacitor 291, any component can be used as long as the component has an electrical capacitance or a coupling capacitance.

By the same token, the capacitor 293 is provided between the gate electrode of the N-type transistor 262 and the power supply VSS which is connected to the source electrode of the N-type transistor. 222. However, in place of the capacitor 293, any component can be used as long as the component has an electrical capacitance or a coupling capacitance.

As described above, in accordance with the CMOS image sensor 50, operations to drive unit pixels 90 by making use of pixel driving signals are properly controlled in order to reduce the coupling effect of a level change of another signal line on the floating diffusion area 123 so as to obtain an image with fewer coupling noises. In addition, the dark-time shading can also be decreased as well.

On top of that, by properly controlling a pixel driving signal, it is possible to reduce the coupling effect of a parasitic capacitor existing between another signal line and the floating diffusion area 123. Thus, it is not necessary to provide a light shielding line between the other signal line and the floating diffusion area 123. As a result, it is possible to reduce the size of the unit pixel 90 and enhance the effectiveness of the opening provided in an area having a given size. In addition, it is also possible to raise the degree of freedom to design the layout of components employed in the unit pixel 90.

Other Typical Configurations of the Unit Pixel
First Other Typical Configuration of the Unit Pixel It is to be noted that the present invention can also be applied to unit-pixel structures other than the unit pixels 90 according to the embodiments described so far. The following description explains the structures of other pixel units to which the present invention can be applied. In addition, in figures described below, components identical with their respective counterparts shown in FIG. 6 or 10 are denoted by the same reference symbols as the counterparts and the explanation of the identical components is omitted if such explanation is not required.

Figure 20:
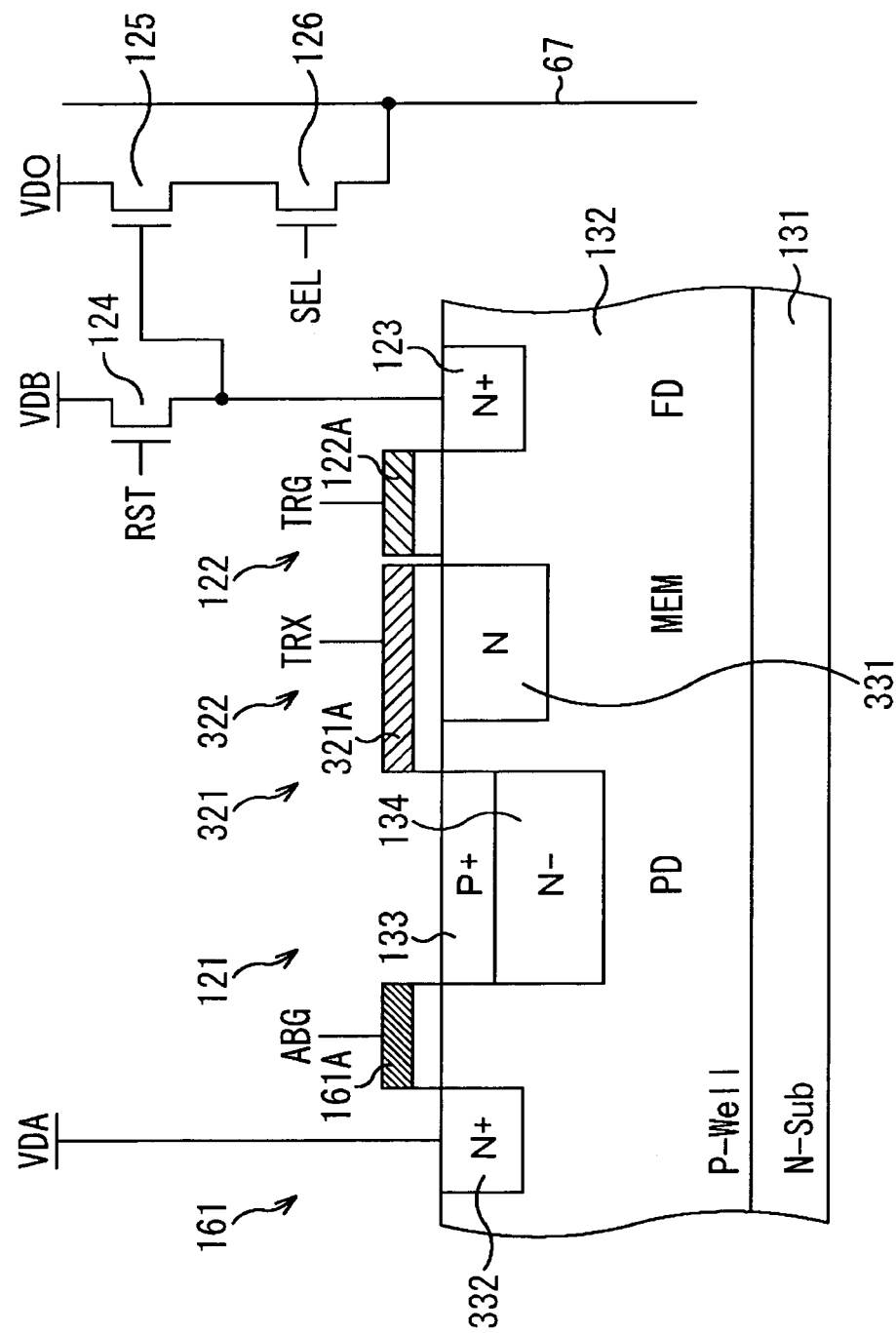
FIG. 20 is a diagram showing the configuration of a unit pixel having a first other typical structure.

FIG. 20 is a diagram showing the configuration of a unit pixel 90B having a first typical structure other than the structure of the unit pixel 90.

In addition to the components employed in the unit pixel 90 shown in FIG. 6, the unit pixel 90B shown in FIG. 20 also employs a second transfer gate 321 and a memory section 322 which are provided between the photodiode 121 and the transfer gate 122. On top of that, on the left-hand side of the photodiode 121 in FIG. 20, the unit pixel 90B also has the overflow gate 161 employed in the unit pixel 90 shown in FIG. 10.

When a transfer pulse TRX is supplied to the gate electrode 321A of the second transfer gate 321, the second transfer gate 321 transfers electric charge from the photodiode 121 to the memory section 322. The electric charge has been generated as a result of an opto-electric conversion process carried out by the photodiode 121 and has been accumulated in the photodiode 121 also denoted by reference symbol PD in the figure. Shielded against light, the memory section 322 is created as an N-type embedded channel 331 beneath the gate electrode 321A. By creating the N-type embedded channel 331 to serve as the memory section 322, it is possible to improve the property of being capable of preventing a dark-time current from being generated on the Si—SiO$_2$ boundary.

As is obvious from the above description, the gate electrode 321A is provided above the memory section 322. By applying the transfer pulse TRX to the gate electrode 321A, modulation can be applied to the memory section 322. That is to say, by applying the transfer pulse TRX to the gate electrode 321A, the electric potential appearing at the memory section 322 becomes deeper. Thus, the amount of saturated electric charge stored in the memory section 322 can be increased to a value greater than that for a configuration applying no modulation to the memory section 322.

In addition, in the unit pixel 90B shown in FIG. 20, when a transfer pulse TRG is supplied to the gate electrode 122A of the transfer gate 122, the transfer gate 122 transfers electric charge accumulated in the memory section 322 to the floating diffusion area 123 also denoted by reference symbol FD in the figure.

The unit pixel 90B also employs an overflow gate 161 to serve as an electric-charge discarding section for discarding electric charge accumulated in the photodiode 121. When a control pulse ABG is supplied to the gate electrode 161A of the overflow gate 161 at the start of an exposure operation, the overflow gate 161 discards electric charge accumulated in the photodiode 121 to an N-type layer drain section 332. The overflow gate 161 also prevents electric charge from getting saturated in the photodiode 121 and leaking out to the memory section 322 in the course of a read operation carried out after the end of the exposure operation. A voltage VDA determined in advance is supplied continuously to the N-type layer drain section 332.

Memory Section and Gate-Electrode Electric Potential

The following description explains the memory section 322 functioning as an electric-charge holding area and an electric potential appearing on the gate electrode 321A of the second transfer gate 321. Since the gate electrode 321A is provided above the memory section 322, the gate electrode 321A also serves as the gate electrode of the memory section 322.

In this embodiment implementing the pixel structure shown in FIG. 20, during the nonconductive period of at least the second transfer gate 321 or the transfer gate 122, the electric potential appearing at the gate electrode of the memory section 322 functioning as an electric-charge holding area or the gate electrode 122A needs to be sustained at a level giving rise to a pinning state. The nonconductive period of the second transfer gate 321 or the transfer gate 122 is a period during which the second transfer gate 321 or the transfer gate 122 respectively is sustained in a nonconductive state. For example, the electric potential appearing on the gate electrode of the memory section 322 needs to be sustained at a level giving rise to a pinning state during the nonconductive period of the second transfer gate 321. To put it more concretely, in order to put the second transfer gate 321, the transfer gate 122 or both in a nonconductive state, a voltage applied to the gate electrode 321A or the gate electrode 122A or voltages applied to both the gate electrode 321A and the gate electrode 122A need to be set at a level giving rise to a pinning state allowing carriers to be accumulated on the Si surface below the gates.

If the transistors each serving as a transfer gate are transistors of the N type as is the case with this embodiment, in order to put the second transfer gate 321 in a nonconductive state, with the P-type well layer 132 taken as a reference, it is necessary to set the voltage applied to the gate electrode 321A at a level providing an electric potential more negative than the electric potential of the ground GND.

The reader is advised to keep in mind that it is also possible to provide a configuration in which the transistors each serving as a transfer gate are transistors of the P type. In such a configuration shown in none of the figures, the P-type well layer 132 is replaced by an N-type well layer and, in order to put the second transfer gate 321 in a nonconductive state, with the N-type well layer taken as a reference, it is necessary to set the voltage applied to the gate electrode 321A at a level providing an electric potential higher than the voltage of the power supply VDD.

As described above, in order to put the second transfer gate 321 in a nonconductive state, a voltage applied to the gate electrode 321A needs to be set at a level giving rise to a pinning state allowing carriers to be accumulated on the Si surface below the gate electrode 321A because of a reason described as follows.

With the P-type well layer 132 taken as a reference, let the electric potential appearing at the gate electrode 321A of the second transfer gate 321 be set at for example 0 V. That is to say, let the electric potential appearing at the gate electrode 321A of the second transfer gate 321 be set at the same level as the P-type well layer 132. In this case, carriers generated from crystal defects on the Si surface are accumulated in the memory section 322 and become a dark-time current. It is thus feared that the quality of the image deteriorates. Accordingly, in this embodiment, the turned-off electric potential of the gate electrode 321A created above the memory section 322 is set at a negative electric potential such as −2.0 V relative to the P-type well layer 132. Therefore, in this embodiment, during an electric-charge holding period, holes can be generated on the Si surface of the memory section 322 and recombined with electrons generated on the Si surface. As a result, the magnitude of the dark-time current can be reduced.

It is to be noted that, due to the fact that the gate electrode 122A of the transfer gate 122 exists on an edge of the memory section 322 in the configuration shown in FIG. 20, the electric potential appearing at the gate electrode 122A also becomes negative as well. Thus, the magnitude of a dark-time current generated on the edge of the memory section 322 can be reduced in the same way.

Second Other Typical Configuration of the Unit Pixel

Figure 21:
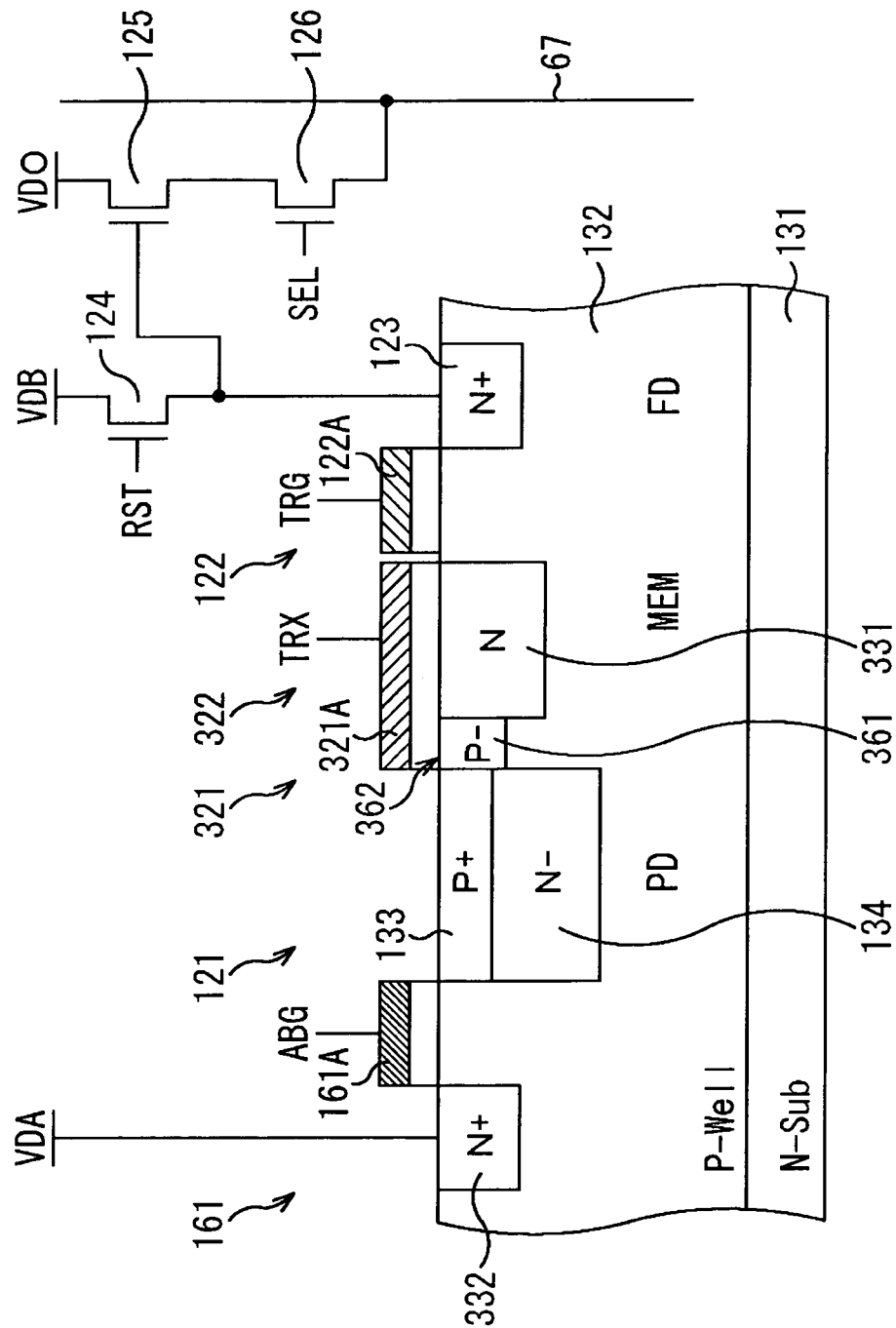
FIG. 21 is a diagram showing the configuration of a unit pixel having a second other typical structure.

FIG. 21 is a diagram showing the configuration of a unit pixel 90C having a second typical structure other than the structure of the unit pixel 90.

The unit pixel 90C is different from the unit pixel 90B shown in FIG. 20 in that the unit pixel 90C is provided with an overflow path 362 implemented by a P-impurity diffusion area 361 created beneath the gate electrode 321A on the boundary between the photodiode 121 and the memory section 322.

In order to create the overflow path 362, it is necessary to lower the electric potential appearing at the P-impurity diffusion area 361. The P-impurity diffusion area 361 can be created by lightly doping the P-impurity diffusion area 361 with N impurities in order to reduce the concentration of P impurities. As an alternative, the P-impurity diffusion area 361 can also be created by reducing the concentration of P impurities when doping the P-impurity diffusion area 361 with P impurities in a process of forming an electric-potential barrier.

As means for preferentially accumulating electric charge generated from light having a small illumination quantity in the photodiode 121, the unit pixel 90C makes use of the overflow path 362 created on the boundary between the photodiode 121 and the memory section 322.

With the P-impurity diffusion area 361 provided on the boundary between the photodiode 121 and the memory section 322, the electric potential appearing on the boundary drops. A portion with the decreased electric potential becomes the overflow path 362. Electric charge originating in the photodiode 121 and having an electric potential higher than the electric potential appearing on the overflow path 362 automatically leaks out to the memory section 322 to be stored in the memory section 322. In other words, electric charge originating in the photodiode 121 and having an electric potential lower than the electric potential appearing on the overflow path 362 is accumulated in the photodiode 121.

The overflow path 362 has a function of an intermediate electric-charge transfer section. That is to say, the overflow path 362 serving as an intermediate electric-charge transfer section transfers electric charge from the photodiode 121 to the memory section 322 as signal electric charge. The transferred electric charge is electric charge generated as a result of an opto-electric conversion process carried out by the photodiode 121 in an exposure period during which an imaging operation is carried out for a plurality of unit pixels 90C at the same time. The overflow path 362 transfers the generated electric charge from the photodiode 121 to the memory section 322 if the amount of the generated electric charge exceeds an amount determined in advance by the electric potential appearing on the overflow path 362. The overflow path 362 terminates the electric-charge transfer as the amount of the generated electric charge no longer exceeds the predetermined amount.

In the typical structure shown in FIG. 21, the overflow path 362 is created by providing the P-impurity diffusion area 361. The reader is advised to keep in mind, however, it is also possible to provide a structure in which, instead of providing the P-impurity diffusion area 361, an N-impurity diffusion area 361 is provided in order to create the overflow path 362.

Third Other Typical Configuration of the Unit Pixel

Figure 22:
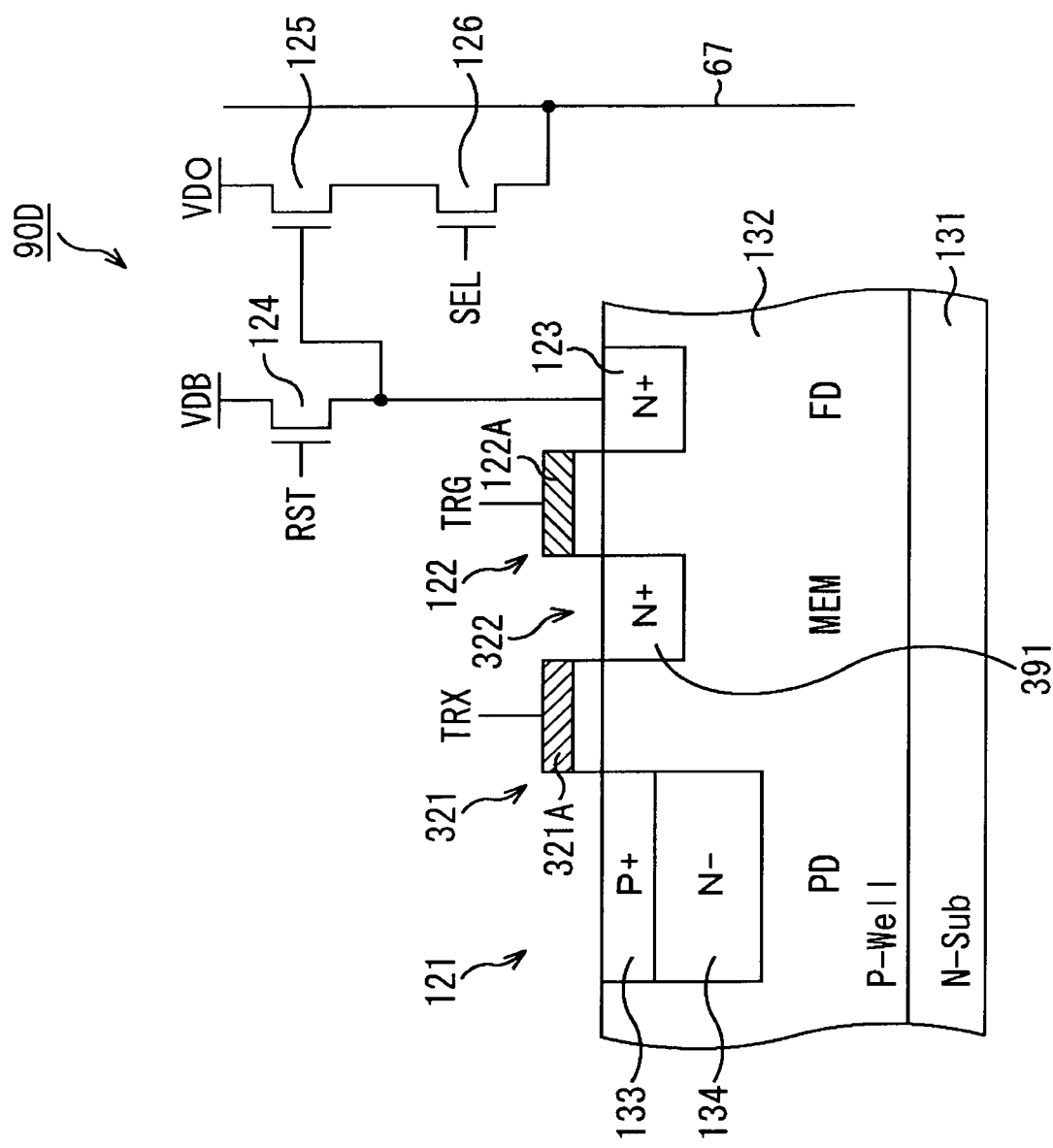
FIG. 22 is a diagram showing the configuration of a unit pixel having a third other typical structure.

FIG. 22 is a diagram showing the configuration of a unit pixel 90D having a third typical structure other than the structure of the unit pixel 90.

In addition to the components employed in the unit pixel 90 shown in FIG. 6, the unit pixel 90D is configured to also include a memory section 322 identical with the floating diffusion area 123. That is to say, in the unit pixel 90D, the gate electrode 321A of the second transfer gate 321 is provided above the P-type well layer 132 on the boundary between the photodiode 121 and the memory section 322. The memory section 322 is implemented by an N-type layer 391 identical with the N-type layer of the floating diffusion area 123.

A global exposure operation is carried out on the unit pixel 90D typically in accordance with a procedure explained as follows. First of all, an electric-charge discarding operation is carried out before a simultaneous exposure operation is started for all unit pixels 90D at the same time. Thus, generated opto-electric charge is accumulated in the photodiode 121. At the end of the simultaneous exposure operation, the second transfer gate 321 is turned on for all unit pixels 90D at the same time in order to transfer the opto-electric charge accumulated in the photodiode 121 to the memory section 322 and hold the opto-electric charge in the memory section 322. After the end of the simultaneous exposure operation, reset and signal levels are read out sequentially on a one-row-after-another basis. To put it in detail, the floating diffusion area 123 is reset and, then, the reset level is read out from the floating diffusion area 123. Subsequently, the opto-electric charge held in the memory section 322 is transferred to the floating diffusion area 123 and, then, the signal level is read out from the floating diffusion area 123.

Fourth Other Typical Configuration of the Unit Pixel

Figure 23:
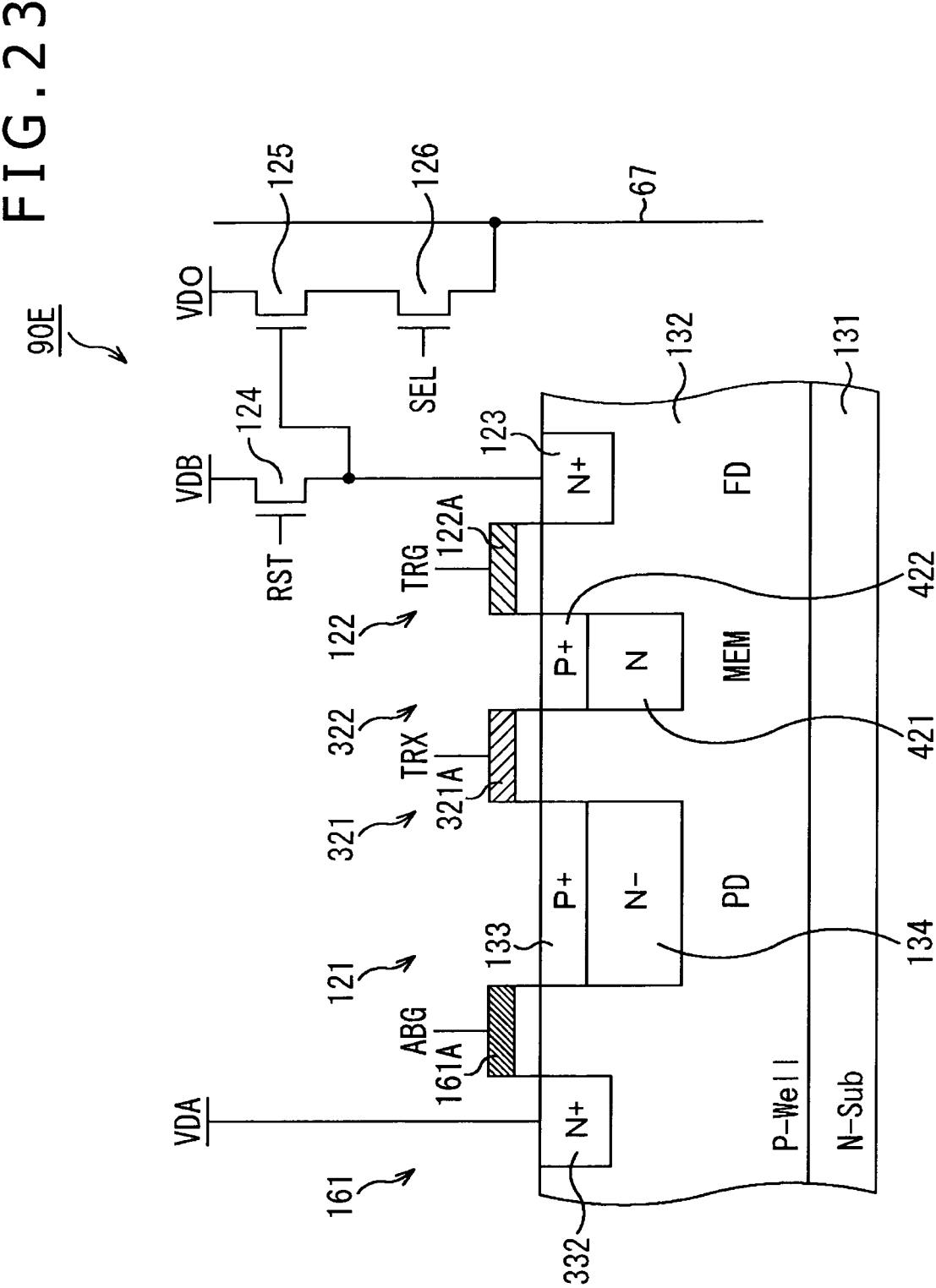
FIG. 23 is a diagram showing the configuration of a unit pixel having a fourth other typical structure.

FIG. 23 is a diagram showing the configuration of a unit pixel 90E having a fourth typical structure other than the structure of the unit pixel 90.

In the unit pixel 90B shown in FIG. 20, the memory section 322 is created as the N-type embedded channel 331. In the unit pixel 90E shown in FIG. 23, on the other hand, the memory section 322 is created as an embedded N-type diffusion area 421.

Even if the memory section 322 is created as the embedded N-type diffusion area 421, it is possible to obtain the same effects as the structure in which the memory section 322 is created as the N-type embedded channel 331. To put it more concretely, inside the P-type well layer 132, the embedded N-type diffusion area 421 is created. On the substrate-surface side, a P-type layer 422 is created. In this way, accumulation of a dark-time current generated on the Si—SiO$_2$ boundary surface in the embedded N-type diffusion area 421 of the memory section 322 can be avoided and the avoidance of such accumulation contributes to the improvement of the image quality.

In this case, it is desirable to set the concentration of impurities in the embedded N-type diffusion area 421 of the memory section 322 at a value smaller than the concentration of impurities in the floating diffusion area 123. By setting the concentration of impurities in the embedded N-type diffusion area 421 at a value smaller than the concentration of impurities in the floating diffusion area 123, it is possible to improve the efficiency of an operation carried out by the transfer gate 122 to transfer electric charge from the memory section 322 to the floating diffusion area 123. The global exposure operation carried out in the unit pixel 90E is the same as the global exposure operation carried out in the unit pixel 90B shown in FIG. 20.

As described above, in the configuration of the unit pixel 90E shown in FIG. 23, the memory section 322 is created as the embedded N-type diffusion area 421. It is to be noted, however, that the unit pixel can also be configured as a non-embedded type structure even though, with such a structure, the magnitude of a dark-time current generated in the memory section 322 may increase in some cases.

In addition, in the configuration of the unit pixel 90E, the overflow gate 161 can be eliminated whereas each of the transfer pulse TRX, the transfer pulse TRG and the reset pulse RST is put in an activated state. By adoption of such a configuration, it is possible to obtain the same effect as that given by the overflow gate 161. That is to say, it is possible to discard electric charge from the photodiode 121 and throw away electric charge leaking out from the photodiode 121 in the read period to the N-type substrate 131.

Fifth Other Typical Configuration of the Unit Pixel

Figure 24:
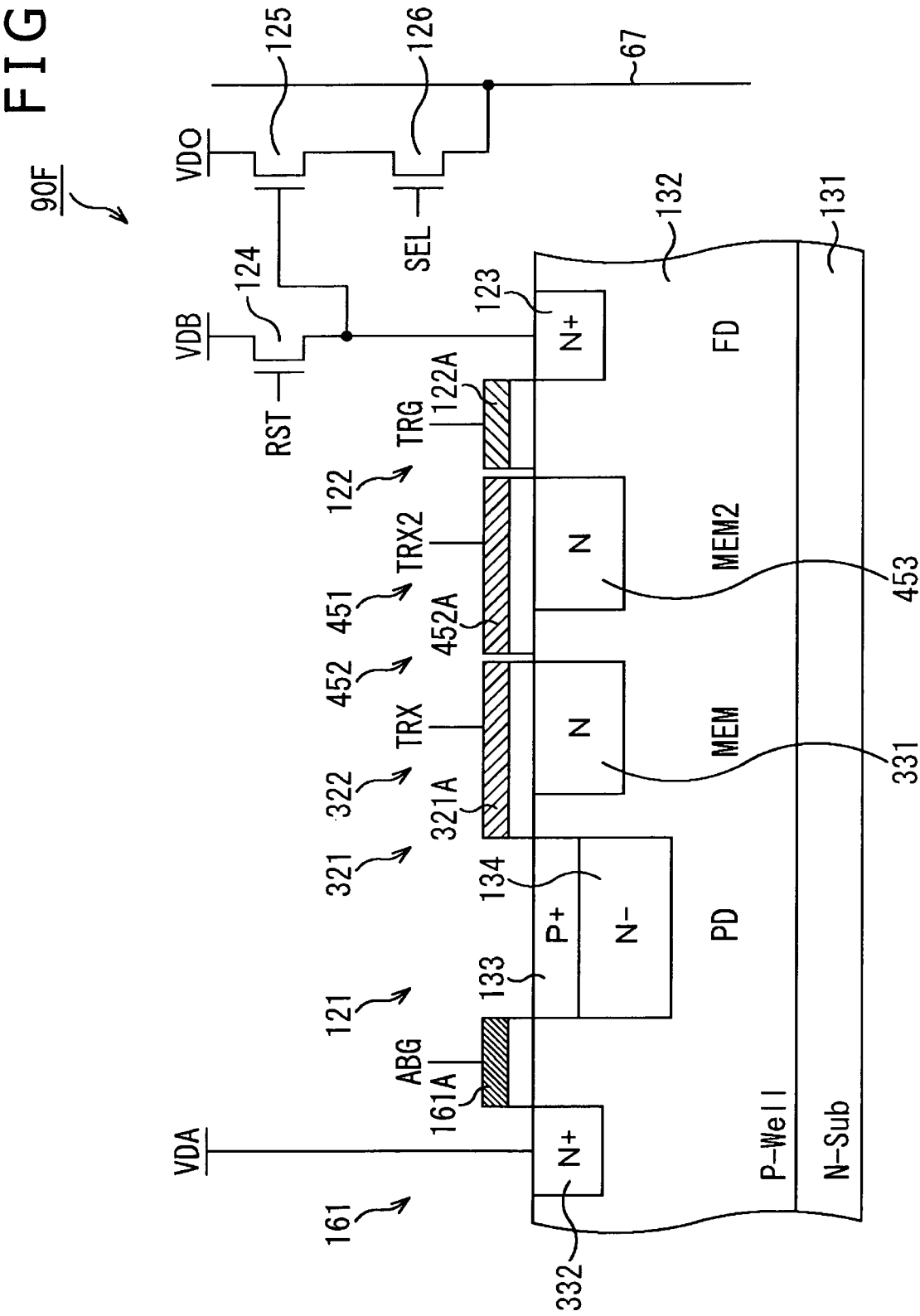
FIG. 24 is a diagram showing the configuration of a unit pixel having a fifth other typical structure.

FIG. 24 is a diagram showing the configuration of a unit pixel 90F having a fifth typical structure other than the structure of the unit pixel 90.

In the unit pixel 90B shown in FIG. 20, one memory section 322 denoted by reference symbol MEM is provided between the photodiode 121 and the floating diffusion area 123. In the case of the unit pixel 90F shown in FIG. 24, on the other hand, another memory section 451 denoted by reference symbol MEM2 is added. That is to say, the unit pixel 90F is configured to have two memory sections.

In addition, a third transfer gate 452 is newly provided between the memory section 322 and the memory section 451. When a transfer pulse TRX2 is supplied to the gate electrode 452A of the third transfer gate 452, the third transfer gate 452 transfers electric charge accumulated in the memory section 322 to the memory section 451. The memory section 451 is created as an N-type embedded channel 453 beneath the gate electrode 452A. The memory section 451 is used for storing electric charge transferred by the third transfer gate 452 from the memory section 322. By creating the memory section 451 as the N-type embedded channel 453, it is possible to prevent a dark-time current from being generated on the Si—SiO$_2$ boundary surface and preventing such generation of a dark-time current contributes to the improvement of the image quality.

Since the memory section 451 has the same configuration as the memory section 322, when the modulation is applied to the memory section 451, in the same way as the memory section 322, the amount of saturated electric charge accumulated in the memory section 451 can be increased to a value greater than that for a case applying no modulation to the memory section 451.

Opto-electric charge accumulated in a global exposure operation carried out on the unit pixel 90F for all unit pixels 90F at the same time is held in the photodiode 121 or the memory section 322 during the global exposure operation. The memory section 451 is used for holding opto-electric charge during a period which is ended when pixel signals are read out.

It is to be noted that the conduction types of the device components employed in the unit pixel 90 described above are no more than typical conduction types. That is to say, an N-type device component can be replaced by a P-type device component and, conversely, a P-type device component can be replaced by an N-type device component. In addition, the conduction type of the N-type substrate 131 can be the N type or the P type.

Typical Configuration of an Electric Apparatus According to the Invention

It is to be noted that the scope of the present invention is by no means limited to the application of the present invention to the solid-state imaging devices. That is to say, the present invention can also be applied to a general electronic apparatus employing a solid-state imaging device in the imaging section (that is, the opto-electric conversion unit) of the apparatus. Typical examples of the electronic apparatus are an imaging apparatus, a terminal having an imaging function and a copy machine employing a solid-state imaging device in the image reading section thereof. Typical examples of the imaging apparatus are a digital still camera and a video camera. It is to be noted that the solid-state imaging device can be created as one chip or as a module created by integrating an imaging section and a signal processing section or an optical system in a package having an imaging function.

Figure 25:
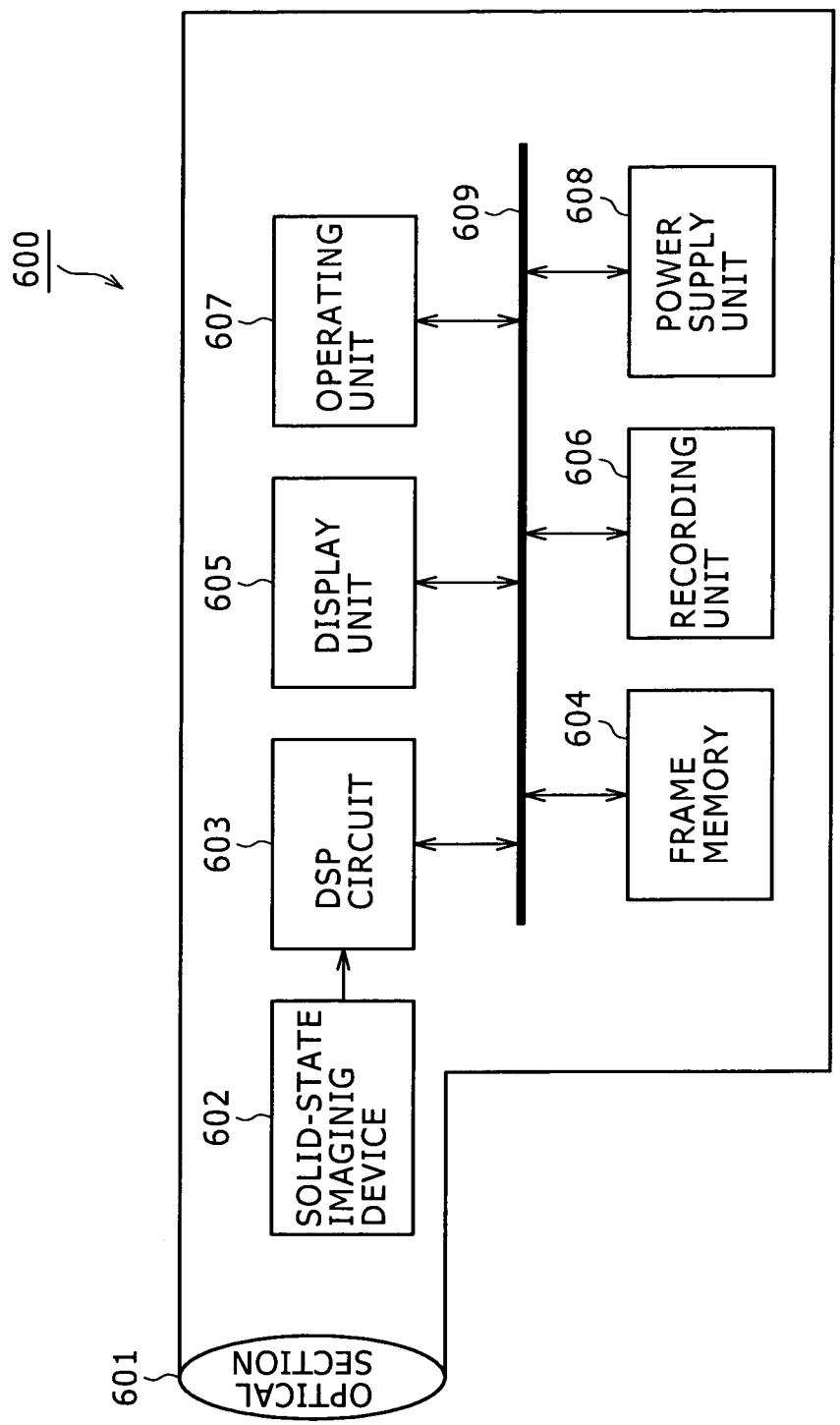
FIG. 25 is a block diagram showing a typical configuration of an embodiment implementing an imaging apparatus used as an electronic apparatus to which the present invention is applied.

FIG. 25 is a block diagram showing a typical configuration of an imaging apparatus 600 used as an electronic apparatus to which the present invention is applied.

The imaging apparatus 600 shown in FIG. 25 employs an optical section 601 including a lens group, a solid-state imaging device 602 and a DSP (Digital Signal Processor) circuit 603 serving as a camera signal processing circuit. Also referred to simply as an imaging device, the solid-state imaging device 602 adopts any one of the configurations of the unit pixels 90 to 90F described so far. In addition, the imaging apparatus 600 also has a frame memory 604, a display unit 605, a recording unit 606, an operating unit 607 and a power supply unit 608. The DSP circuit 603, the frame memory 604, the display unit 605, the recording unit 606, the operating unit 607 and the power supply unit 608 are connected to each other by a bus line 609.

The optical section 601 receives incident light (also referred to as image light) from an imaging object and creates an image on the imaging surface of the solid-state imaging device 602 on the basis of the light. The solid-state imaging device 602 converts the quantity of the incident light serving as a basis for creating the image on the imaging surface of the solid-state imaging device 602 into an electrical signal for every unit pixel and outputs the electrical signal to the DSP circuit 603 as a pixel signal. The solid-state imaging device 602 is typically the CMOS image sensor 50 according to any of the embodiments described before. That is to say, the solid-state imaging device 602 is capable of carrying out an imaging operation including a global exposure operation for getting rid of distortions.

The display unit 605 is a panel-type display apparatus such as liquid-crystal display apparatus or an organic EL (Electro Luminescence) display apparatus. The display unit 605 displays a moving or standstill image created on the imaging surface of the solid-state imaging device 602. The recording unit 606 records the moving or standstill image created on the imaging surface of the solid-state imaging device 602 on a recording medium such as a video tape or a DVD (Digital Versatile Disk).

In accordance with an operation carried out by the user on the operating unit 607, the operating unit 607 issues an operation instruction to carry out one of a variety of functions provided for the imaging apparatus 600. The power supply unit 608 generates operation power at a variety of levels and supplies the power to the DSP circuit 603, the frame memory 604, the display unit 605, the recording unit 606 and the operating unit 607 at the levels proper for these power recipients.

As described above, the imaging apparatus 600 employs the CMOS image sensor 50 according to any of the embodiments explained before as the solid-state imaging device 602. Since the CMOS image sensor 50 is capable of reducing noises caused by variations in transistor threshold voltage and, hence, assuring a high S/N ratio, the quality of the taken image can be improved. The imaging apparatus 600 capable of generating an image having a high quality can be used as a digital still camera, a video camera or a camera module used in a mobile equipment such as a hand-held phone.

Each of the embodiments described above is a typical implementation realizing a CMOS image sensor including a pixel array created as a matrix by two-dimensionally laying out unit pixels each used for detecting signal charge, which has an amount determined by the quantity of visible light, as a physical quantity.

However, the scope of the present invention is by no means limited to the application of the present invention to the CMOS image sensor. That is to say, the present invention can also be applied to general solid-state imaging devices each adopting a column method making use of a column processing section provided for each pixel column of the pixel array.

In addition, the scope of the present invention is by no means limited to the application of the present invention to a solid-state imaging device for detecting a distribution of the quantity of incident visible light and taking an image representing the distribution. That is to say, the present invention can also be applied to a solid-state imaging device for detecting a distribution of another quantity such as the quantity of an incident infrared ray or an X ray or a distribution of the number of particles and taking an image representing the distribution. In a broader sense, the present invention can also be applied to general solid-state imaging devices each used for detecting a distribution of another physical quantity such as a pressure or a static capacitance and taking an image representing the distribution. Also referred to as physical-quantity distribution detection apparatus, the general solid-state imaging devices include a fingerprint detection sensor.

It is to be noted that implementations of the present invention are by no means limited to the embodiments described above. That is to say, each of the embodiments can be further changed to a variety of modified versions within a range not deviating from essentials of the present invention.

The present application contains subject matter related to that disclosed in Japanese Priority Patent Application JP 2010-080524 filed in the Japan Patent Office on Mar. 31, 2010, the entire content of which is hereby incorporated by reference.

What is claimed is:

1. A solid-state imaging device employing a plurality of unit pixels each having an opto-electric conversion section configured to convert incident light into electric charge and an electric-charge holding section configured to hold a signal voltage representing said electric charge produced by said opto-electric conversion section, said solid-state imaging device further comprising:

read means for reading out a reset voltage appearing on said electric-charge holding section as a result of setting said electric-charge holding section at a predetermined voltage from said electric-charge holding section as a reset level at a reset-level read time after reading out said signal voltage representing said electric charge produced by said opto-electric conversion section from said electric-charge holding section as a signal level at a signal-level read time and for computing a difference between said signal level and said reset level in order to generate a pixel signal; and control means for controlling an operation to provide said unit pixel with a pixel driving signal driving said unit pixel but affecting a coupling phenomenon occurring in said electric-charge holding section so as to make the state of said pixel driving signal at a first reset time at which said electric-charge holding section is reset immediately prior to a transfer of electric charge from said opto-electric conversion section to said electric-charge holding section the same as the state of said pixel driving signal at a second reset time at which said electric-charge holding section is reset immediately prior to an operation to read out said reset level from said electric-charge holding section, and the state of said pixel driving signal at said signal-level read time the same as the state of said pixel driving signal at said reset-level read time.

2. The solid-state imaging device according to claim 1 wherein said pixel driving signal is a select pulse for selecting said unit pixel from which said pixel signal is read out.

3. The solid-state imaging device according to claim 1 wherein said pixel driving signal is a control pulse for driving an electric-charge discarding section employed in said unit pixel to serve as a section for discarding electric charge accumulated in said opto-electric conversion section.

4. The solid-state imaging device according to claim 1 wherein a voltage determined in advance is applied to a signal line connected to said read means to serve as a line for reading out said signal and reset levels from said electric-charge holding section.

5. The solid-state imaging device according to claim 1 wherein said control means controls said unit pixels composing a plurality of pixel rows each including said unit pixels laid out in a direction determined in advance so as to carry out a reset operation on said pixel rows simultaneously at said first reset time.

6. The solid-state imaging device according to claim 1 wherein said control means controls said unit pixels composing a plurality of pixel rows each including said unit pixels laid out in a direction determined in advance so as to carry out an operation to transfer electric charge from said opto-electric conversion section to said electric-charge holding section for said pixel rows at the same time.

7. The solid-state imaging device according to claim 1 wherein:

said control means employs output means used for outputting said pixel driving signal and composed of a first transistor for turning on said pixel driving signal and a second transistor for turning off said pixel driving signal; and said control means controls said output means so as to shift a driving timing of said first transistor from a driving timing of said second transistor.

8. The solid-state imaging device according to claim 7 wherein said output means further includes a current limiter for suppressing output fluctuations generated by a power supply connected to said first transistor and output fluctuations generated by a power supply connected to said second transistor.

9. The solid-state imaging device according to claim 8 wherein:

the gate electrode of a third transistor employed in said current limiter is connected by a switch or a resistor to a bias line set at a voltage determined in advance;

an electrical capacitance is provided between said gate electrode and the source electrode of said first or second transistor in order to make the magnitude of a current flowing through said third transistor constant.

10. The solid-state imaging device according to claim 9 wherein said control means controls said current limiter so as to put said current limiter in an operative state during an operation to drive a plurality of said pixel rows at the same time and put said current limiter in an inoperative state during an operation to drive only one of said pixel rows.

11. The solid-state imaging device according to claim 1 wherein:

said pixel driving signal includes a select pulse for selecting said unit pixel from which said pixel signal is read out and a control pulse for driving an electric-charge discarding section employed in said unit pixel to serve as a section for discarding electric charge accumulated in said opto-electric conversion section; and at both said first and second reset times, said control pulse for driving an electric-charge discarding section is set in an active state at a high level and said select pulse is set in an inactive state at a low level.

12. A driving method for driving a solid-state imaging device employing a plurality of unit pixels each having an opto-electric conversion section configured to convert incident light into electric charge and an electric-charge holding section configured to hold a signal voltage representing said electric charge produced by said opto-electric conversion section, said driving method comprising the steps of:

reading out a reset voltage appearing on said electric-charge holding section as a result of setting said electric-charge holding section at a predetermined voltage from said electric-charge holding section as a reset level at a reset-level read time after reading out said signal voltage representing said electric charge produced by said opto-electric conversion section from said electric-charge holding section as a signal level at a signal-level read time and for computing a difference between said signal level and said reset level in order to generate a pixel signal; and controlling an operation to provide said unit pixel with a pixel driving signal driving said unit pixel but affecting a coupling phenomenon occurring in said electric-charge holding section so as to make the state of said pixel driving signal at a first reset time at which said electric-charge holding section is reset immediately prior to a transfer of electric charge from said opto-electric conversion section to said electric-charge holding section the same as the state of said pixel driving signal at a second reset time at which said electric-charge holding section is reset immediately prior to an operation to read out said reset level from said electric-charge holding section, and the state of said pixel driving signal at said signal-level read time the same as the state of said pixel driving signal at said reset-level read time.

13. The driving method according to claim 12 wherein said pixel driving signal is a select pulse for selecting said unit pixel from which said pixel signal is read out.

14. The driving method according to claim 12 wherein said pixel driving signal is a control pulse for driving an electric-charge discarding section employed in said unit pixel to serve as a section for discarding electric charge accumulated in said opto-electric conversion section.

15. The driving method according to claim 12 whereby said a voltage determined in advance is applied to a signal line connected to read means of said solid-state imaging device to serve as a line for reading out said signal and reset levels from said electric-charge holding section.

16. The driving method according to claim 12 whereby said unit pixels composing a plurality of pixel rows each including said unit pixels laid out in a direction determined in advance are controlled so as to carry out a reset operation on said pixel rows simultaneously at said first reset time.

17. The driving method according to claim 12 whereby said unit pixels composing a plurality of pixel rows each including said unit pixels laid out in a direction determined in advance are controlled so as to carry out an operation to transfer electric charge from said opto-electric conversion section to said electric-charge holding section for said pixel rows at the same time.

18. An electronic apparatus including a plurality of unit pixels each having an opto-electric conversion section configured to convert incident light into electric charge and an electric-charge holding section configured to hold a signal voltage representing said electric charge produced by said opto-electric conversion section wherein said electronic apparatus further comprises:

read means for reading out a reset voltage appearing on said electric-charge holding section as a result of setting said electric-charge holding section at a predetermined voltage from said electric-charge holding section as a reset level at a reset-level read time after reading out said signal voltage representing said electric charge produced by said opto-electric conversion section from said electric-charge holding section as a signal level at a signal-level read time and for computing a difference between said signal level and said reset level in order to generate a pixel signal; and control means for controlling an operation to provide said unit pixel with a pixel driving signal driving said unit pixel but affecting a coupling phenomenon occurring in said electric-charge holding section so as to make the state of said pixel driving signal at a first reset time at which said electric-charge holding section is reset immediately prior to a transfer of electric charge from said opto-electric conversion section to said electric-charge holding section the same as the state of said pixel driving signal at a second reset time at which said electric-charge holding section is reset immediately prior to an operation to read out said reset level from said electric-charge holding section, and the state of said pixel driving signal at said signal-level read time the same as the state of said pixel driving signal at said reset-level read time.

* * * * *